(12) United States Patent
Chou et al.

(10) Patent No.: US 10,222,516 B2
(45) Date of Patent: Mar. 5, 2019

(54) LIGHT BLOCKING SHEET, LIGHT BLOCKING ELEMENT, OPTICAL ELEMENT, IMAGING LENS ASSEMBLY AND LENS MODULE

(71) Applicant: LARGAN PRECISION CO., LTD., Taichung (TW)

(72) Inventors: Ming-Ta Chou, Taichung (TW); Wei-Che Tung, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/960,560

(22) Filed: Dec. 7, 2015

(65) Prior Publication Data
US 2017/0108627 A1 Apr. 20, 2017

(30) Foreign Application Priority Data
Oct. 16, 2015 (TW) .............................. 104216638 U

(51) Int. Cl.
*G02B 5/00* (2006.01)
*G02B 5/20* (2006.01)
*G02B 9/60* (2006.01)
*G02B 13/00* (2006.01)

(52) U.S. Cl.
CPC ............. *G02B 5/003* (2013.01); *G02B 5/208* (2013.01); *G02B 9/60* (2013.01); *G02B 13/0045* (2013.01)

(58) Field of Classification Search
CPC .......... G02B 5/003; G02B 5/208; G02B 9/60; G02B 13/0045; G02B 5/005; G02B 5/22

USPC .......................................................... 359/894
See application file for complete search history.

(56) References Cited

U.S. PATENT DOCUMENTS

| | | | |
|---|---|---|---|
| 2,625,087 A * | 1/1953 | Steineck | G03B 19/023 352/102 |
| 7,457,052 B2 | 11/2008 | Hirata | |
| 7,663,812 B2 | 2/2010 | Chang | |
| 7,746,576 B2 | 6/2010 | Lee | |
| 7,961,411 B2 | 6/2011 | Lee | |
| 8,570,673 B2 | 10/2013 | Lai et al. | |
| 8,824,066 B2 | 9/2014 | Weng | |
| 2002/0109773 A1* | 8/2002 | Kuriyama | H04N 5/2254 348/36 |
| 2002/0181126 A1* | 12/2002 | Nishioka | G02B 3/14 359/726 |
| 2003/0189769 A1* | 10/2003 | Anderson | G02B 6/2931 359/819 |

(Continued)

*Primary Examiner* — Darryl J Collins
*Assistant Examiner* — Journey F Sumlar
(74) *Attorney, Agent, or Firm* — McClure, Qualey & Rodack, LLP

(57) ABSTRACT

A light blocking sheet includes a first surface, a second surface, an inner annular surface and an outer annular surface. The second surface is corresponding to the first surface. The inner annular surface connects the first surface and the second surface, and forms an inner opening. The outer annular surface connects an edge of the first surface and an edge of the second surface, and includes at least three notches disposed on the outer annular surface and at least three arc surfaces located on the outer annular surface, wherein the at least three notches and the at least three arc surfaces are alternately arranged on the outer annular surface, and the at least three arc surfaces are coaxial and have different arc lengths.

23 Claims, 15 Drawing Sheets

(56) References Cited

U.S. PATENT DOCUMENTS

| | | | |
|---|---|---|---|
| 2004/0036989 A1* | 2/2004 | Duon | G02B 7/02 |
| | | | 359/819 |
| 2008/0043351 A1* | 2/2008 | Hirakawa | G02B 7/08 |
| | | | 359/823 |
| 2012/0050605 A1* | 3/2012 | Nidaira | G02B 5/005 |
| | | | 348/360 |
| 2012/0105712 A1* | 5/2012 | Terahara | G02B 7/021 |
| | | | 348/360 |

* cited by examiner

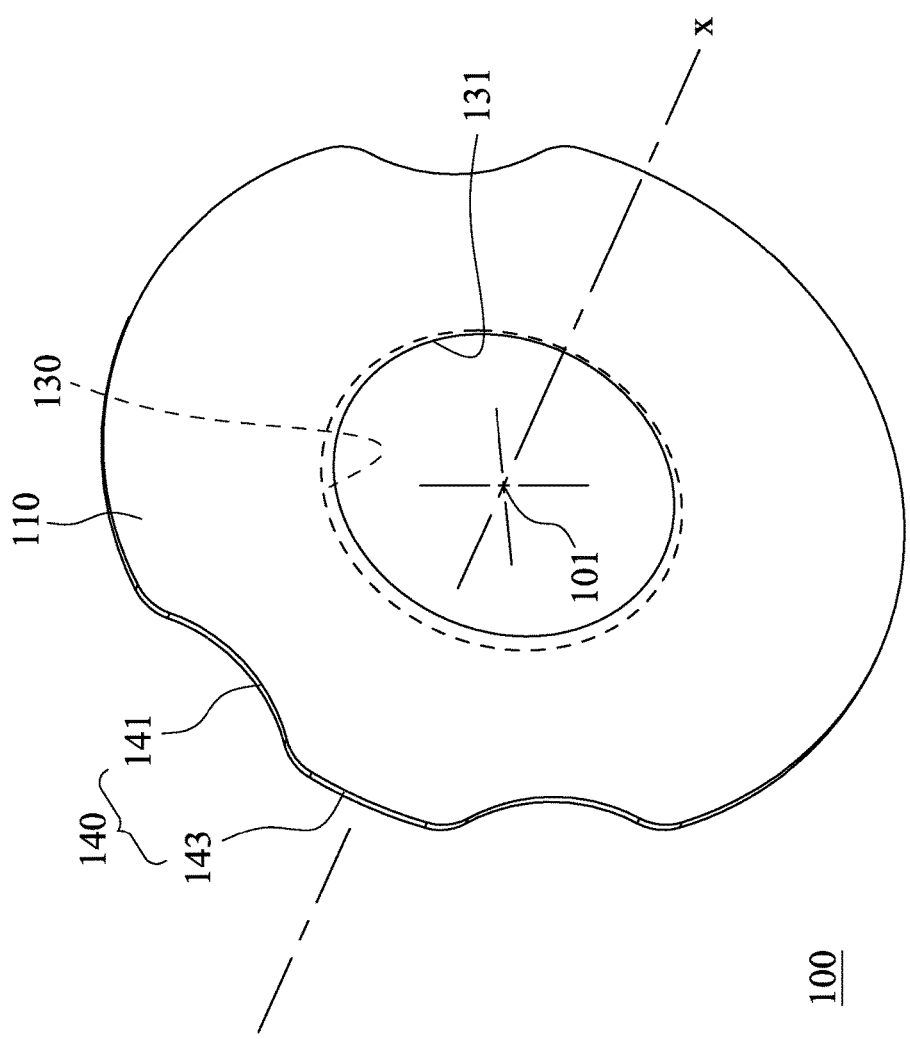

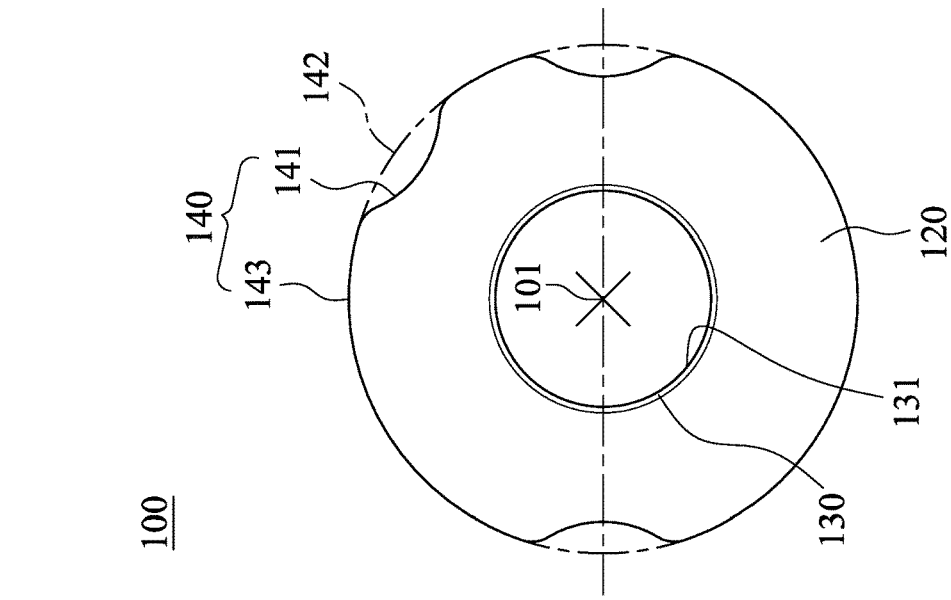
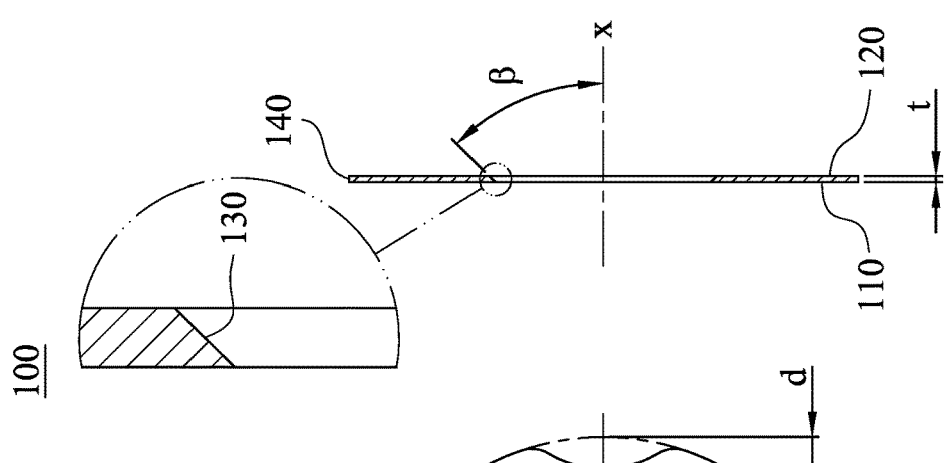
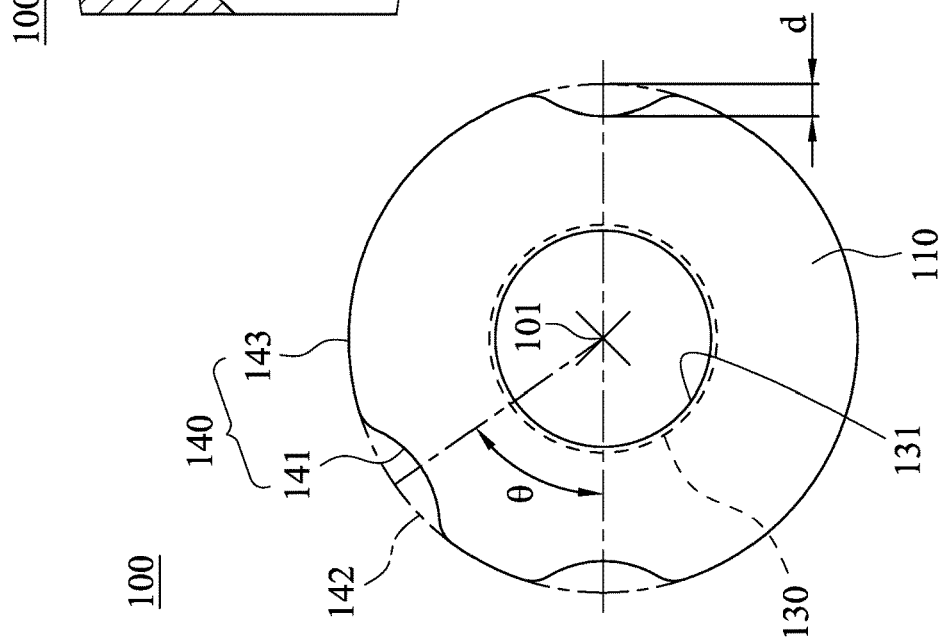

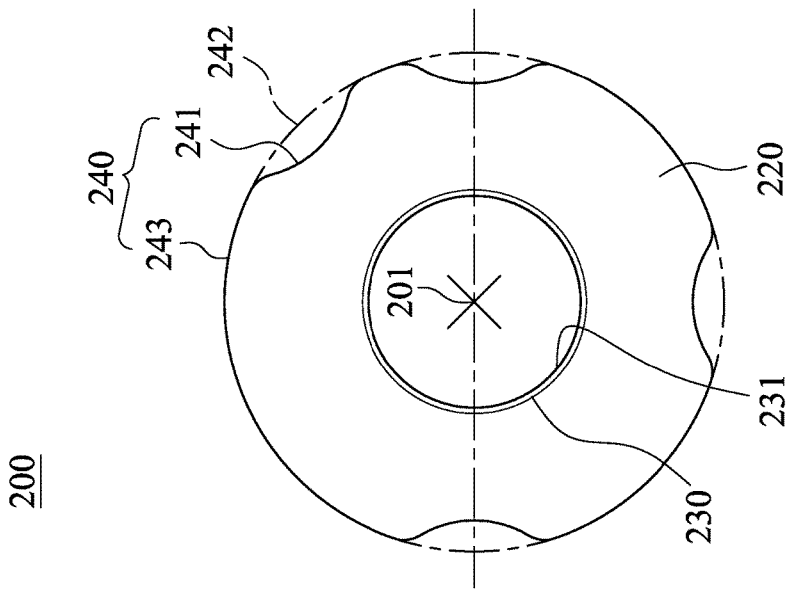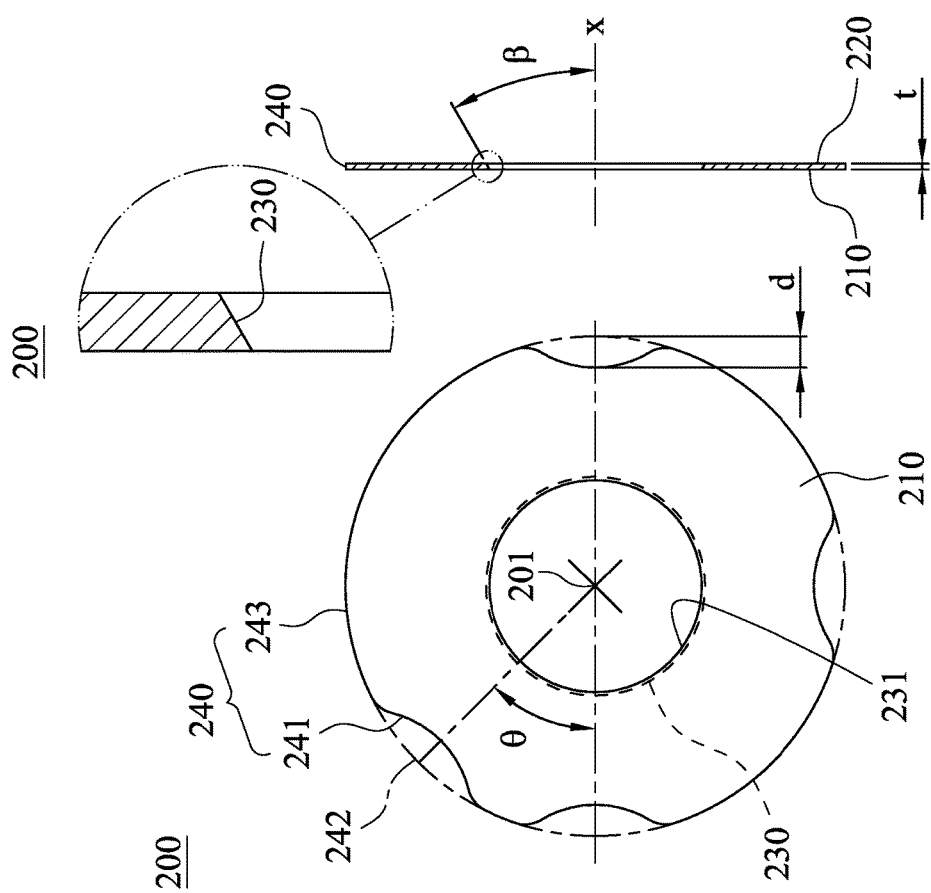
Fig. 3B
Fig. 3C
Fig. 3A

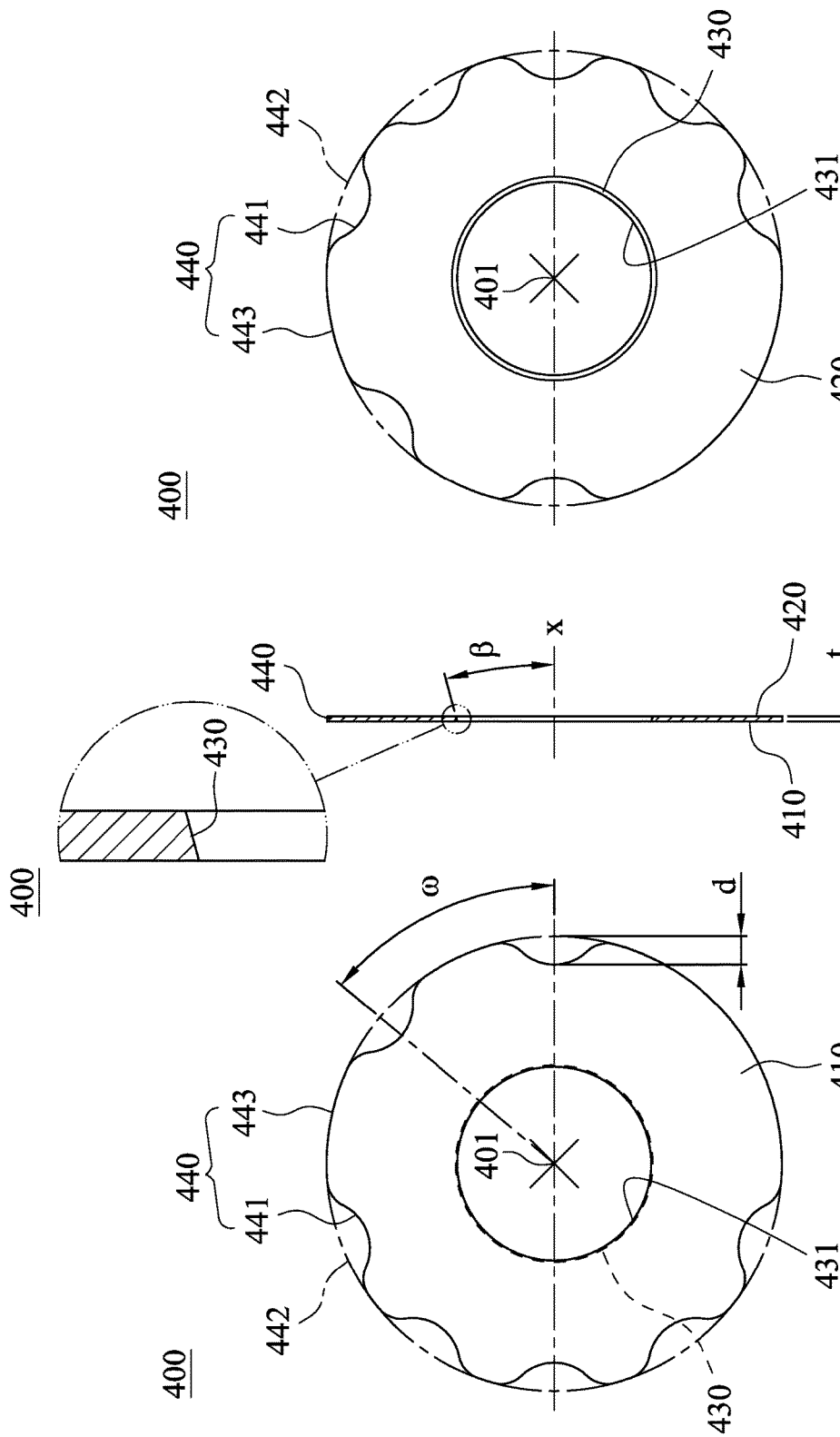

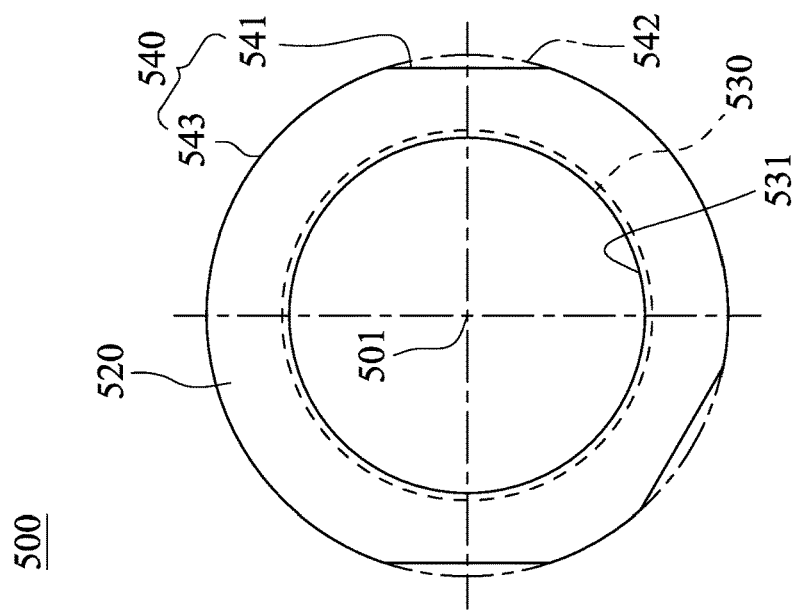
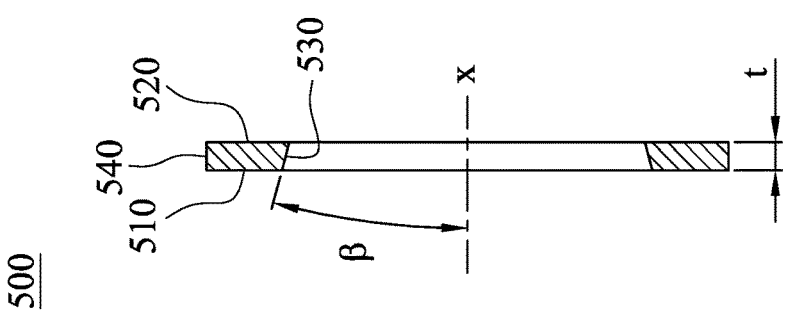
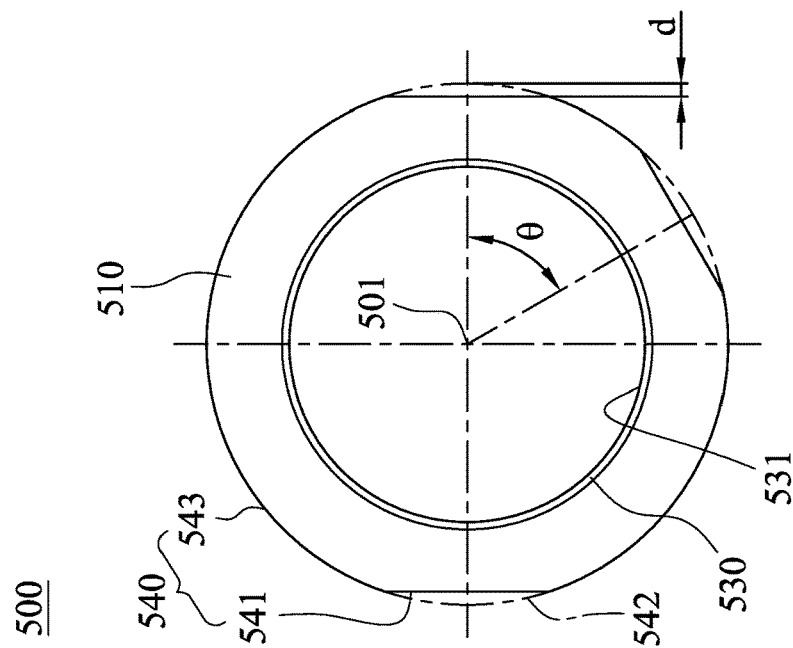
Fig. 7B
Fig. 7C
Fig. 7A

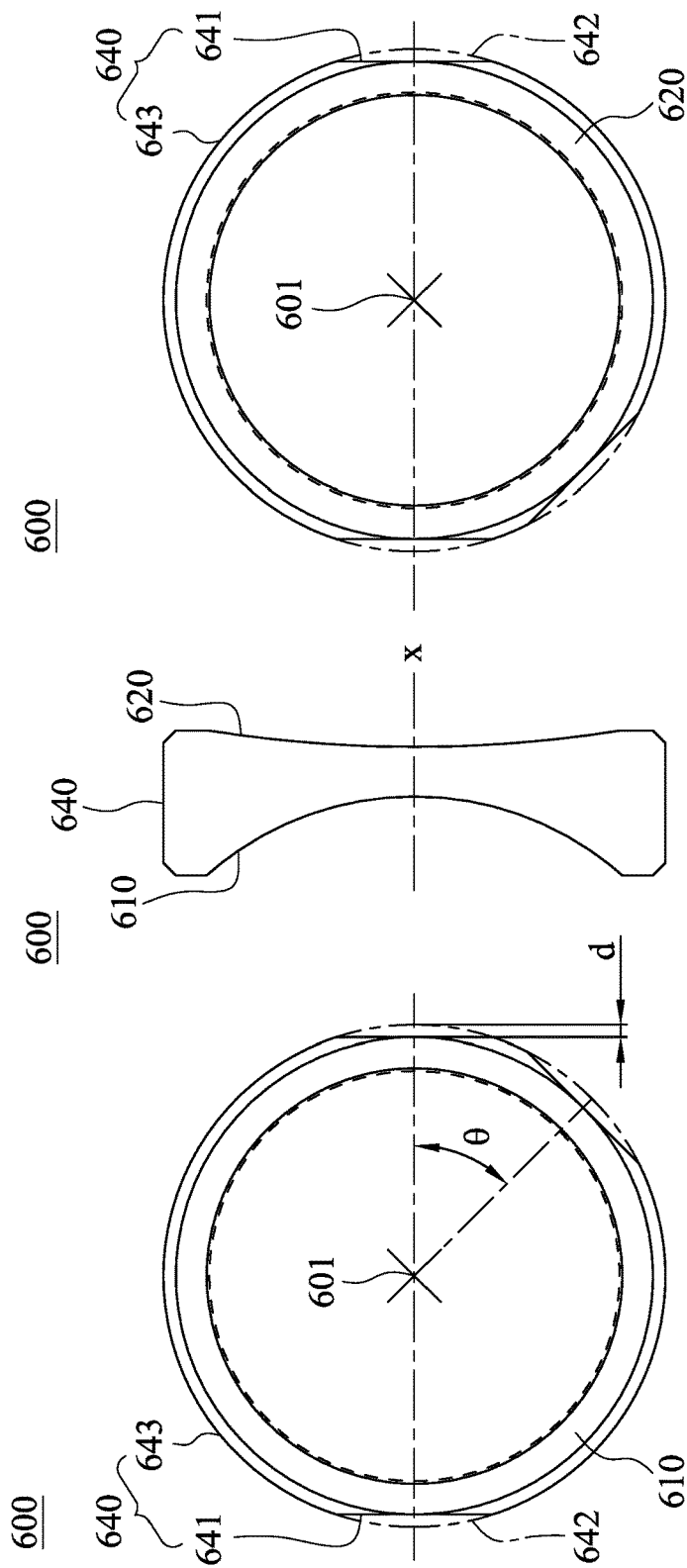

LIGHT BLOCKING SHEET, LIGHT BLOCKING ELEMENT, OPTICAL ELEMENT, IMAGING LENS ASSEMBLY AND LENS MODULE

RELATED APPLICATIONS

This application claims priority to Taiwan Application Serial Number 104216638, filed Oct. 16, 2015, which is herein incorporated by reference.

BACKGROUND

Technical Field

The present disclosure relates to a light blocking sheet, a light blocking element, an optical element, an imaging lens assembly and a lens module. More particularly, the present disclosure relates to a light blocking sheet, a light blocking element, an optical element, an imaging lens assembly and a lens module for preventing a miss operation.

Description of Related Art

Recently, the portable devices, such as smart phone and pad, are developed rapidly and ubiquitous in the human life. The imaging lens disposed therein is thus becomes growth industry. With the improvement of the technology, more and more demands for high qualities of imaging lens come out. Therefore, in addition to improving the quality of imaging lens in optical design field, the precision of manufacturing and assembling processes are needed to be improved too.

The conventional lens module usually includes lens elements and a optical element, such as a light blocking sheet, a light blocking element or a spacer, disposed between the lens elements. However, because the sizes of the lens elements and the optical element become smaller while the size of the lens module becomes small, thus the difficulties of assembling process as well as the difficulties of manufacturing process increase.

Base on the aforementioned problems, how to improve the structure of the light blocking sheet, the light blocking element, the optical element, etc., the precision of the assembling, and the quality of the imaging lens become a pursuit target for practitioners.

SUMMARY

According to one aspect of the present disclosure, a light blocking sheet includes a first surface, a second surface, an inner annular surface and an outer annular surface. The second surface is corresponding to the first surface. The inner annular surface connects the first surface and the second surface, and forms an inner opening. The outer annular surface connects an edge of the first surface and an edge of the second surface, and includes at least three notches and at least three arc surfaces. The at least three notches are disposed on the outer annular surface. The at least three arc surfaces are located on the outer annular surface. The at least three notches and the at least three arc surfaces are alternately arranged on the outer annular surface, and the at least three arc surfaces are coaxial and have different arc lengths.

According to another aspect of the present disclosure, an imaging lens assembly includes the light blocking sheet according to the aforementioned aspect.

According to further another aspect of the present disclosure, a lens module includes the imaging lens assembly according to the aforementioned aspect and an image sensor, wherein the image sensor is disposed on an image surface of the imaging lens assembly.

According to still another aspect of the present disclosure, a light blocking element includes a first surface, a second surface, an inner annular surface and an outer annular surface. The second surface is corresponding to the first surface. The inner annular surface connects the first surface and the second surface, and forms an inner opening. The outer annular surface connects an edge of the first surface and an edge of the second surface, and includes three notches and three arc surfaces. The three notches are disposed on the outer annular surface. The three arc surfaces are located on the outer annular surface. The three notches and the three arc surfaces are alternately arranged on the outer annular surface, and the three arc surfaces are coaxial and have different arc lengths.

According to yet another aspect of the present disclosure, an imaging lens assembly includes the light blocking element according to the aforementioned aspect.

According to further another aspect of the present disclosure, an optical element includes a first surface, a second surface and an outer annular surface. The second surface is corresponding to the first surface. The outer annular surface connects an edge of the first surface and an edge of the second surface, and includes three notches and three arc surfaces. The three notches are disposed on the outer annular surface, wherein a virtual outer circular arc line is formed between two ends of each of the notches, the virtual outer circular arc lines are coaxial, there is one connecting line which is formed between each middle point of any two virtual outer circular arc lines passing through a center of the optical element. The three arc surfaces are located on the outer annular surface, wherein the three notches and the three arc surfaces are alternately arranged on the outer annular surface, and the three arc surfaces are coaxial and have different arc lengths.

According to still another aspect of the present disclosure, an imaging lens assembly includes the optical element according to the aforementioned aspect.

According to yet another aspect of the present disclosure, a lens module includes the imaging lens assembly according to the aforementioned aspect and an image sensor, wherein the image sensor is disposed on an image surface of the imaging lens assembly.

BRIEF DESCRIPTION OF THE DRAWINGS

FIG. 1 is a three dimensional view of a light blocking sheet according to the 1st embodiment of the present disclosure;

FIG. 2A is a schematic view of the first surface of the light blocking sheet according to the 1st embodiment in FIG. 1;

FIG. 2B is a schematic view of the second surface of the light blocking sheet according to the 1st embodiment in FIG. 1;

FIG. 2C is a cross-sectional view of the light blocking sheet according to the 1st embodiment of FIG. 1;

FIG. 3A is a schematic view of the first surface of a light blocking sheet according to the 2nd embodiment of the present disclosure;

FIG. 3B is a schematic view of the second surface of the light blocking sheet according to the 2nd embodiment in FIG. 3A;

FIG. 3C is a cross-sectional view of the light blocking sheet according to the 2nd embodiment of FIG. 3A;

FIG. 5A is a schematic view of the first surface of a light blocking sheet according to the 4th embodiment of the present disclosure;

FIG. 5B is a schematic view of the second surface of the light blocking sheet according to the 4th embodiment in FIG. 5A;

FIG. 5C is a cross-sectional view of the light blocking sheet according to the 4th embodiment of FIG. 5A;

FIG. 7A is a schematic view of the first surface of the light blocking element according to the 5th embodiment in FIG. 6;

FIG. 7B is a schematic view of the second surface of the light blocking element according to the 5th embodiment in FIG. 6;

FIG. 7C is a cross-sectional view of the light blocking element according to the 5th embodiment of FIG. 6;

FIG. 8A is a schematic view of the first surface of an optical element according to the 6th embodiment of the present disclosure;

FIG. 8B is a schematic view of the second surface of the optical element according to the 6th embodiment in FIG. 8A;

FIG. 8C is a cross-sectional view of the optical element according to the 6th embodiment of FIG. 8A;

DETAILED DESCRIPTION

Figure 4A:
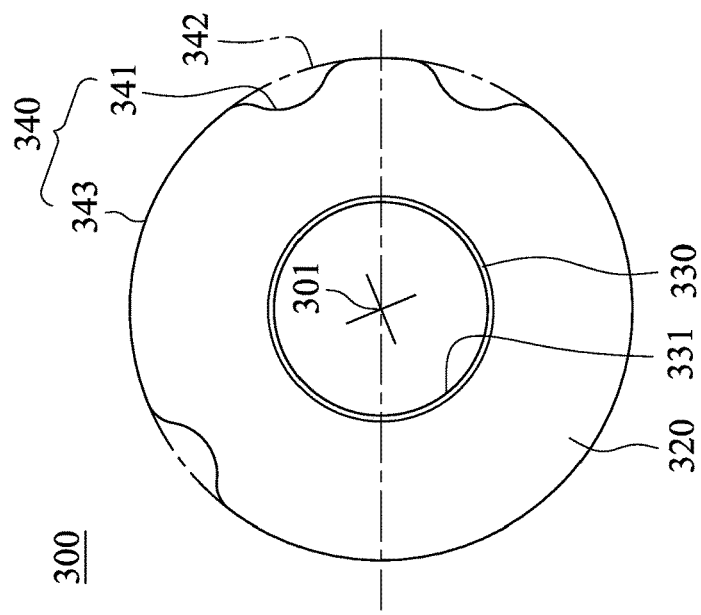
FIG. 4A is a schematic view of the first surface of a light blocking sheet according to the 3rd embodiment of the present disclosure.

FIG. 1 is a three dimensional view of a light blocking sheet 100 according to the 1st embodiment of the present disclosure. In FIG. 1, the light blocking sheet 100 includes a first surface 110, a second surface 120, an inner annular surface 130 and an outer annular surface 140. The second surface 120 is corresponding to the first surface 110. The inner annular surface 130 connects the first surface 110 and the second surface 120, and forms an inner opening 131. The outer annular surface 140 connects an edge of the first surface 110 and an edge of the second surface 120.

FIG. 2A is a schematic view of the first surface 110 of the light blocking sheet 100 according to the 1st embodiment in FIG. 1. FIG. 2B is a schematic view of the second surface 120 of the light blocking sheet 100 according to the 1st embodiment in FIG. 1. In detail, the outer annular surface 140 includes at least three notches 141 and at least three arc surfaces 143, wherein the three notches 141 are disposed on the outer annular surface 140, the three arc surfaces 143 are located on the outer annular surface 140. The three notches 141 and the three arc surfaces 143 are alternately arranged on the outer annular surface 140. The three arc surfaces 143 are coaxial and have different arc lengths (according to the 1st embodiment, each arc center of the arc surfaces 143 is a center 101), that is, the three notches 141 are asymmetrically disposed on the outer annular surface 140, so that the arc surfaces 143 alternately arranged between each two notches 141 has different arc lengths. Therefore, it is favorable for judging a correct assembling direction, thus the light blocking sheet 100 in the present disclosure can prevent a miss assembling in the assembling process. In the 1st embodiment of the present disclosure, each of the arc lengths of the three arc surfaces 143 is 0.37 mm, 1.83 mm and 2.99 mm.

In FIGS. 2A and 2B, A depressed direction of each notch 141 extends toward the center 101 of the light blocking sheet 100 (that is, the depressed direction of each notch 141 extends toward the inner opening 131), and contours of the notches 141 are the same, wherein the "contour" of each notch 141 means the shape formed on the outer annular surface 140, the first surface 110 and the second surface 120 of the light blocking sheet 100 by each notch 141. Thus, when the contours of the notches 141 are the same, the shape on the first surface 110 formed by each notch 141 would be the same, and the shape of the second surface 120 formed by each notch 141 would be the same, too. Hence, the complexity of the manufacturing of the light blocking sheet 100 can be decreased.

In FIG. 2A, when a number of the notches 141 is N, the following condition is satisfied: 3≤N<8. A virtual outer circular arc line 142 is formed between two ends of each of the notches 141, the virtual outer circular arc lines 142 are coaxial (according to the 1st embodiment, each arc center of the virtual outer circular arc lines 142 is the center 101), and there is only one connecting line which is formed between each middle point of any two virtual outer circular arc lines 142 passing through the center 101 of the light blocking sheet 100. Therefore, the correctness for judging a correct assembling direction can be increased.

In FIG. 2A, according to the 1st embodiment of the present disclosure, a number of the notches 141 is N, and N=3, wherein there is one connecting line which is formed between each middle point of the two virtual outer circular arc lines 142 passing through the center 101 of the light blocking sheet 100, the other notch 141 is located on the outer annular surface 140 of one side of the connecting line. Therefore, it is favorable for judging a correct assembling direction.

Further, in the three notches 141, when an angle between a middle point of the virtual outer circular arc line 142 of the other notch 141 and the middle point of the virtual outer circular arc line 142 of one of the two notches 141 which is near to the other notch 141 is θ, the following condition is satisfied: 20 degrees<θ<75 degrees. Therefore, the relative location of the notches 141 is proper, so that the judgment for correctly assembling the light blocking sheet 100 can be increased. According to the 1st embodiment of the present disclosure, θ=60 degrees.

In FIG. 2A, when a maximal depth of each of the notches 141 is d (that is, a maximal depressed distance of each notch 141 extends toward the inner opening 131), the following condition is satisfied: 0.03 mm<d<0.35 mm. Therefore, when the light blocking sheet 100 is applied to an imaging lens assembly or a lens module, the light leak from the notches 141 can be prevented. Furthermore, the maximal depths of the notches 141 can be the same, that is, when the contours of the notches 141 are the same, the maximal depths of the notches 141 are also the same. According to the 1st embodiment of the present disclosure, the maximal depths d of the notches 141 are the same, and d=0.15 mm.

FIG. 2C is a cross-sectional view of the light blocking sheet 100 according to the 1st embodiment of FIG. 1. In FIG. 2C, when a thickness of the light blocking sheet 100 is t, the following condition is satisfied: 0.01 mm<t<0.10 mm. Therefore, it is favorable for reducing the reflection of the inner annular surface 130 due to the light blocking sheet 100 with thinner thickness. According to the 1st embodiment of the present disclosure, t=0.03 mm.

In FIG. 2C, when an angle between an extending direction of the inner annular surface 130 and an extending direction of a central axis X of the light blocking sheet 100 is β, the following condition is satisfied: 15 degrees<β<55 degrees. Therefore, the ability for completely blocking the stray light can be enhanced. According to the 1st embodiment of the present disclosure, β=45 degrees.

Furthermore, the inner opening 131 of the light blocking sheet 100 can be a punching hole. Therefore, it is favorable for the manufacture of the light blocking sheet 100.

FIG. 3A is a schematic view of the first surface 210 of a light blocking sheet 200 according to the 2nd embodiment of the present disclosure. FIG. 3B is a schematic view of the second surface 220 of the light blocking sheet 200 according to the 2nd embodiment in FIG. 3A. In FIGS. 3A and 3B, the light blocking sheet 200 includes a first surface 210, a second surface 220, an inner annular surface 230 and an outer annular surface 240. The second surface 220 is corresponding to the first surface 210. The inner annular surface 230 connects the first surface 210 and the second surface 220, and forms an inner opening 231. The outer annular surface 240 connects an edge of the first surface 210 and an edge of the second surface 220.

In detail, according to the 2nd embodiment, the outer annular surface 240 includes four notches 241 and four arc surfaces 243 (N=4), wherein the four notches 241 are disposed on the outer annular surface 240, the four arc surfaces 243 are located on the outer annular surface 240, wherein the four notches 241 and the four arc surfaces 243 are alternately arranged on the outer annular surface 240. At least three arc surface 243 are coaxial and have different arc lengths (according to the 2nd embodiment, each arc center of the arc surfaces 243 is a center 201), that is, the four notches 241 are asymmetrically disposed on the outer annular surface 240, so that the arc surfaces 243 alternately arranged between each two notches 241 has different arc lengths. Therefore, it is favorable for judging a correct assembling direction, thus the light blocking sheet 200 in the present disclosure can prevent a miss assembling in the assembling process. In the 2nd embodiment of the present disclosure, each of the arc lengths of the four arc surfaces 243 is 0.16 mm, 1.10 mm, 1.10 mm and 2.04 mm.

According to the 2nd embodiment, a virtual outer circular arc line 242 is formed between two ends of each of the notches 241, the virtual outer circular arc lines 242 are coaxial (according to the 2nd embodiment, each arc center of the virtual outer circular arc lines 242 is the center 201), wherein, in FIG. 3A, there is a connecting line which is formed between each middle point of two virtual outer circular arc lines 242 of two notches 241 passing through the center 201 of the light blocking sheet 200, and for the other two notches 241, one notch 241 is near to one of the two notches 241 which forms the connecting line, thus an angle between a middle point of the virtual outer circular arc line 242 of the other notch 241 of the other two notches 241 and the middle point of the virtual outer circular arc line 242 of the notch 241 which is near to the other notch 241 is θ, θ=45 degrees.

According to the 2nd embodiment of the present disclosure, a maximal depth of each of the notches 241 is d (that is, a maximal depressed distance of each notch 241 extends toward the inner opening 231), the contours of the notches 241 are the same, the maximal depths d of the notches 241 are also the same, d=0.15 mm.

FIG. 3C is a cross-sectional view of the light blocking sheet 200 according to the 2nd embodiment of FIG. 3A. In FIG. 3C, according to the 2nd embodiment of the present disclosure, a thickness of the light blocking sheet 200 is t, and t=0.022 mm.

In FIG. 3C, according to the 2nd embodiment of the present disclosure, an angle between an extending direction of the inner annular surface 230 and an extending direction of a central axis X of the light blocking sheet 200 is β, and β=30 degrees.

Furthermore, the inner opening 231 of the light blocking sheet 200 can be a punching hole.

FIG. 4A is a schematic view of the first surface 310 of a light blocking sheet 300 according to the 3rd embodiment of the present disclosure. FIG. 4B is a schematic view of the second surface 320 of the light blocking sheet 300 according to the 3rd embodiment in FIG. 4A. In FIGS. 4A and 4B, the light blocking sheet 300 includes a first surface 310, a second surface 320, an inner annular surface 330 and an outer annular surface 340. The second surface 320 is corresponding to the first surface 310. The inner annular surface 330 connects the first surface 310 and the second surface 320, and forms an inner opening 331. The outer annular surface 340 connects an edge of the first surface 310 and an edge of the second surface 320.

In detail, according to the 3rd embodiment, the outer annular surface 340 includes three notches 341 and three arc surfaces 343 (N=3), wherein the three notches 341 are disposed on the outer annular surface 340, the three arc surfaces 343 are located on the outer annular surface 340, the three notches 341 and the three arc surfaces 343 are alternately arranged on the outer annular surface 340. The three arc surface 343 are coaxial and have different arc lengths (according to the 3rd embodiment, each arc center of the arc surfaces 343 is a center 301), that is, the three notches 341 are asymmetrically disposed on the outer annular surface 340, so that the arc surfaces 343 alternately arranged between each two notches 341 has different arc lengths. Therefore, it is favorable for judging a correct assembling direction, thus the light blocking sheet 300 in the present disclosure can prevent a miss assembling in the assembling process. In the 3rd embodiment of the present disclosure, each of the arc lengths of the three arc surfaces 343 is 0.30 mm, 1.56 mm and 3.75 mm.

According to the 3rd embodiment, a virtual outer circular arc line 342 is formed between two ends of each of the notches 341, the virtual outer circular arc lines 342 are coaxial (according to the 3rd embodiment, each arc center of the virtual outer circular arc lines 342 is the center 301), wherein a minimal angle between each two middle points of each two virtual outer circular arc lines 342 which are adjacent to each other is α, and α=45 degrees.

According to the 3rd embodiment of the present disclosure, a maximal depth of each of the notches 341 is d (that is, a maximal depressed distance of each notch 341 extends toward the inner opening 331), the contours of the notches 341 are the same, the maximal depths d of the notches 341 are also the same, d=0.15 mm.

Figure 4C:
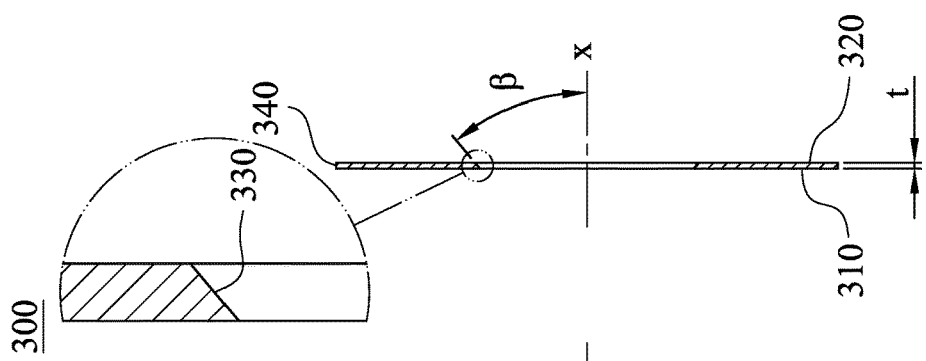
FIG. 4C is a cross-sectional view of the light blocking sheet according to the 3rd embodiment of FIG. 4A.
Figure 4B:
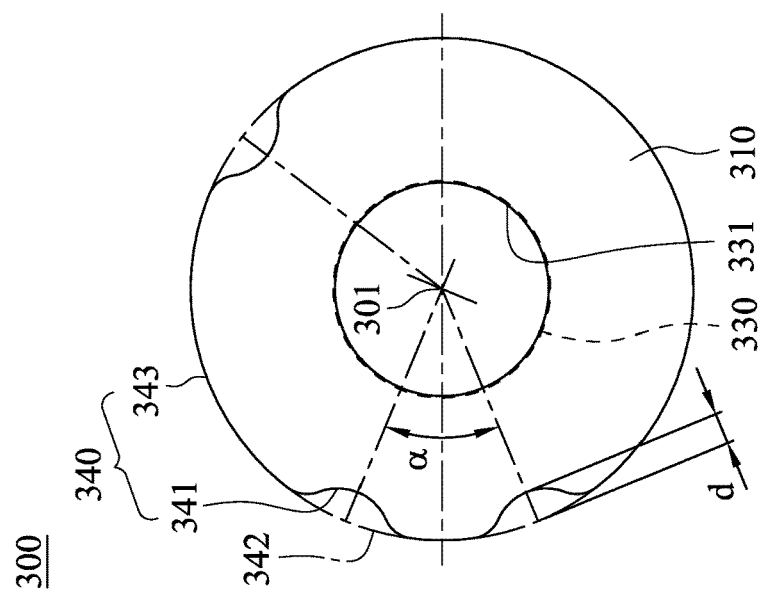
FIG. 4B is a schematic view of the second surface of the light blocking sheet according to the 3rd embodiment in FIG. 4A.

FIG. 4C is a cross-sectional view of the light blocking sheet 300 according to the 3rd embodiment of FIG. 4A. In FIG. 4C, according to the 3rd embodiment of the present disclosure, a thickness of the light blocking sheet 300 is t, and t=0.041 mm.

In FIG. 4C, according to the 3rd embodiment of the present disclosure, an angle between an extending direction of the inner annular surface 330 and an extending direction of a central axis X of the light blocking sheet 300 is β, and β=40 degrees.

Furthermore, the inner opening 331 of the light blocking sheet 300 can be a punching hole.

FIG. 5A is a schematic view of the first surface 410 of a light blocking sheet 400 according to the 4th embodiment of the present disclosure. FIG. 5B is a schematic view of the second surface 420 of the light blocking sheet 400 according to the 4th embodiment in FIG. 5A. In FIGS. 5A and 5B, the light blocking sheet 400 includes a first surface 410, a second surface 420, an inner annular surface 430 and an outer annular surface 440. The second surface 420 is corresponding to the first surface 410. The inner annular surface 430 connects the first surface 410 and the second surface 420, and forms an inner opening 431. The outer annular surface 440 connects an edge of the first surface 410 and an edge of the second surface 420.

In detail, according to the 4th embodiment, the outer annular surface 440 includes seven notches 441 and seven arc surfaces 443 (N=7), wherein the seven notches 441 are disposed on the outer annular surface 440, the seven arc surfaces 443 are located on the outer annular surface 440, wherein the seven notches 441 and the seven arc surfaces 443 are alternately arranged on the outer annular surface 440. At least four arc surfaces 443 are coaxial and have different arc lengths (according to the 4th embodiment, each arc center of the arc surfaces 443 is a center 401), that is, the seven notches 441 are asymmetrically disposed on the outer annular surface 440, so that at least four arc surfaces 443 alternately arranged between each two notches 441 has different arc lengths. Therefore, it is favorable for judging a correct assembling direction, thus the light blocking sheet 400 in the present disclosure can prevent a miss assembling in the assembling process. In the 4th embodiment of the present disclosure, each of the arc lengths of the seven arc surfaces 443 is 0.0897 mm, 0.0897 mm, 0.0897 mm, 0.0897 mm, 0.404 mm, 0.613 mm and 1.66 mm.

According to the 4th embodiment, a virtual outer circular arc line 442 is formed between two ends of each of the notches 441, the virtual outer circular arc lines 442 are coaxial (according to the 4th embodiment, each arc center of the virtual outer circular arc lines 442 is the center 401), wherein, in FIG. 5A, there is a connecting line which is formed between each middle point of two virtual outer circular arc lines 442 of two notches 441 passing through the center 401 of the light blocking sheet 400, and for others four notches 441, each two notches 441 are symmetrically located on two sides of the connecting line and disposed on the outer annular surface 440. The other notch 441 is disposed on the outer annular surface 440 which is on one side of the connecting line, and is near to one of the notches 441 having the connecting line passing through the center 401 of the light blocking sheet 400, so that an angle between a middle point of the virtual outer circular arc line 442 of the other notch 441 and the middle point of the virtual outer circular arc line 442 of the notch 441 which is near to the other notch 441 is ω, ω=50 degrees. Therefore, it is favorable for judging a correct assembling direction by the asymmetrical arrangement of the notches.

According to the 4th embodiment of the present disclosure, a maximal depth of each of the notches 441 is d (that is, a maximal depressed distance of each notch 441 extends toward the inner opening 431), the contours of the notches 441 are the same, the maximal depths d of the notches 441 are also the same, d=0.15 mm.

FIG. 5C is a cross-sectional view of the light blocking sheet 400 according to the 4th embodiment of FIG. 5A. In FIG. 5C, according to the 4th embodiment of the present disclosure, a thickness of the light blocking sheet 400 is t, and t=0.03 mm.

In FIG. 5C, according to the 4th embodiment of the present disclosure, an angle between an extending direction of the inner annular surface 430 and an extending direction of a central axis X of the light blocking sheet 400 is β, and β=15 degrees.

Furthermore, the inner opening 431 of the light blocking sheet 400 can be a punching hole.

Figure 6:
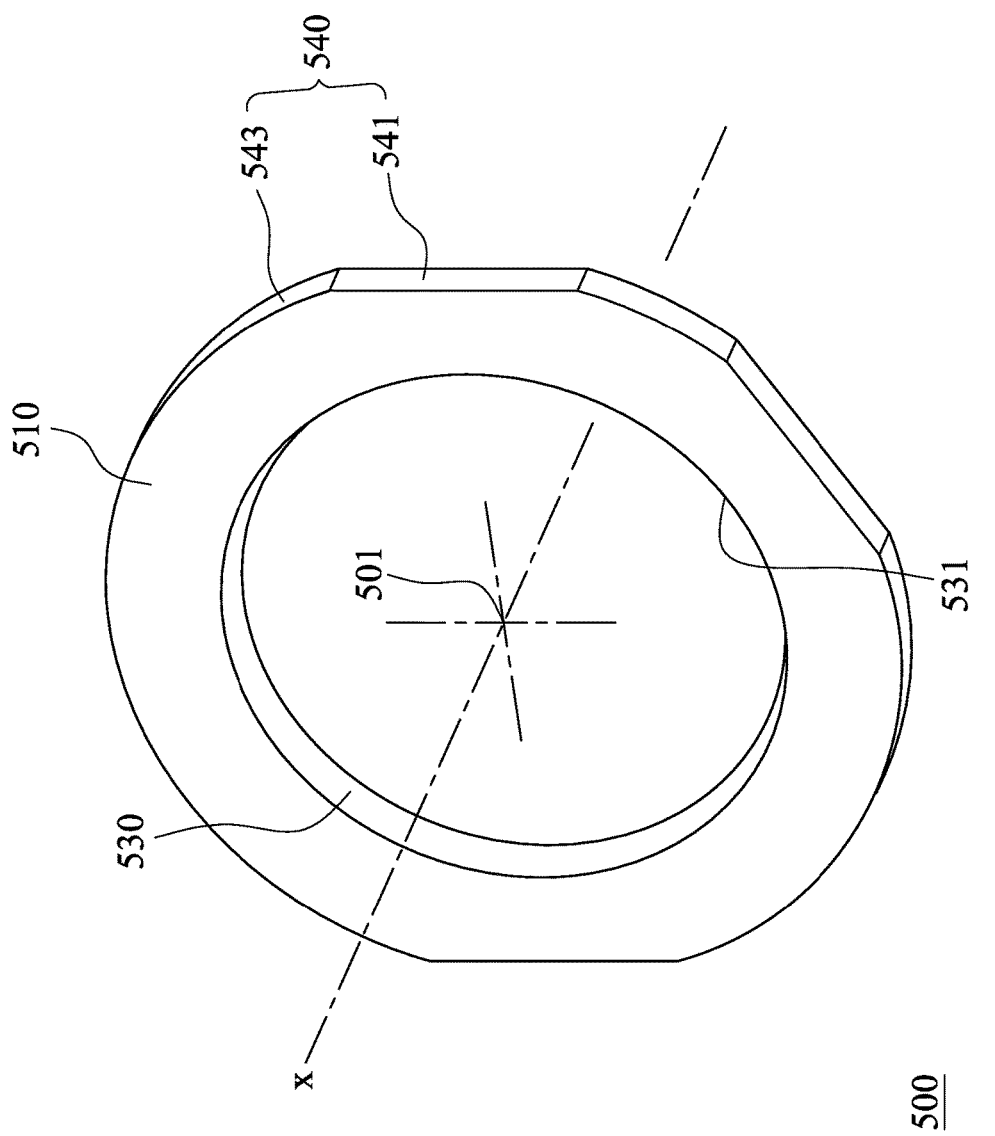
FIG. 6 is a three dimensional view of a light blocking element according to the 5th embodiment of the present disclosure.

FIG. 6 is a three dimensional view of a light blocking element 500 according to the 5th embodiment of the present disclosure. In FIG. 6, the light blocking element 500 is a spacer. The light blocking element 500 includes a first surface 510, a second surface 520, an inner annular surface 530 and an outer annular surface 540. The second surface 520 is corresponding to the first surface 510. The inner annular surface 530 connects the first surface 510 and the second surface 520, and forms an inner opening 531. The outer annular surface 540 connects an edge of the first surface 510 and an edge of the second surface 520.

FIG. 7A is a schematic view of the first surface 510 of the light blocking element 500 according to the 5th embodiment in FIG. 6. FIG. 7B is a schematic view of the second surface 520 of the light blocking element 500 according to the 5th embodiment in FIG. 6. In detail, the outer annular surface 540 includes at least three notches 541 and at least three arc surfaces 543 (N=3), wherein the three notches 541 are disposed on the outer annular surface 540, the three arc surfaces 543 are located on the outer annular surface 540, the three notches 541 and the three arc surfaces 543 are alternately arranged on the outer annular surface 540. The three arc surface 543 are coaxial and have different arc lengths (according to the 5th embodiment, each arc center of the arc surfaces 543 is a center 501), that is, the three notches 541 are asymmetrically disposed on the outer annular surface 540, so that the arc surfaces 543 alternately arranged between each two notches 541 has different arc lengths. Therefore, it is favorable for judging a correct assembling direction, thus the light blocking element 500 in the present disclosure can prevent a miss assembling in the assembling process. In the 5th embodiment of the present disclosure, each of the arc lengths of the three arc surfaces 543 is 0.91 mm, 3.24 mm and 5.57 mm.

According to the 5th embodiment, a virtual outer circular arc line 542 is formed between two ends of each of the notches 541, the virtual outer circular arc lines 542 are coaxial (according to the 5th embodiment, each arc center of the virtual outer circular arc lines 542 is the center 501), wherein, in FIG. 7A, there is a connecting line which is formed between each middle point of two virtual outer circular arc lines 542 of two notches 541 passing through the center 501 of the light blocking element 500, an angle between a middle point of the virtual outer circular arc line 542 of the other notch 541 and the middle point of the virtual outer circular arc line 542 of one of the two notches 541 which is near to the other notch 541 is θ, θ=60 degrees.

According to the 5th embodiment, the three notches 541 are straight cutting notches. That is, each notch 541 is formed into planar on the outer annular surface 540, and is formed into a straight edge on the first surface 510 and the second surface 520, respectively. Therefore, the manufacturing efficiency of the light blocking element 500 can be increased. Further, a maximal depth of each of the notches 541 is d (that is, a maximal distance from the middle point of the virtual outer circular arc line 542 of each notch 541 extends to the outer annular surface 540), the contours of the notches 541 are the same, the maximal depths d of the notches 541 are also the same, d=0.11 mm.

FIG. 7C is a cross-sectional view of the light blocking element 500 according to the 5th embodiment of FIG. 6. In FIG. 7C, according to the 5th embodiment of the present disclosure, a thickness of the light blocking element 500 is t, and t=0.235 mm.

In FIG. 7C, according to the 5th embodiment of the present disclosure, an angle between an extending direction of the inner annular surface 530 and an extending direction of a central axis X of the light blocking element 500 is β, and β=15 degrees.

Figure 7D:
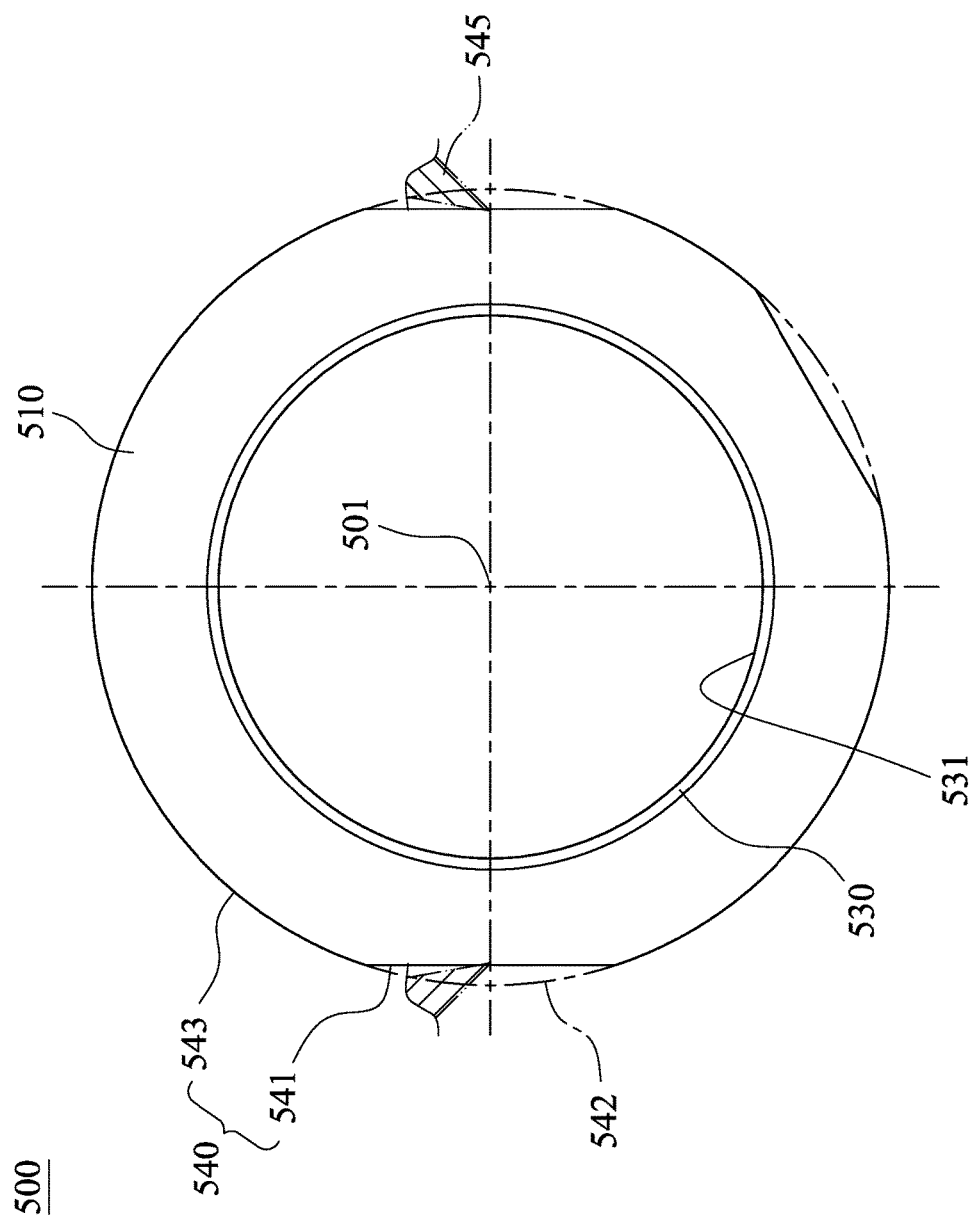
FIG. 7D is a schematic view of a manufacturing process of the light blocking element according to the 5th embodiment of FIG. 6.

FIG. 7D is a schematic view of a manufacturing process of the light blocking element 500 according to the 5th embodiment of FIG. 6. In FIG. 7D, the light blocking element 500 can further include a gate end 545 located on one of the two notches 541 which have the connecting line formed between each middle point of two virtual outer circular arc lines 542 thereof passing through the center 501 of the light blocking element 500. Corresponding to a gate end 545 of a mold (not shown), the complexity of the design of the mold can be decreased. In detail, in the 5th embodiment, the light blocking element 500 includes two gate ends 545 located on each of the two notches 541 which have the connecting line which is formed between each middle point of two virtual outer circular arc lines 542 of two notches 541 passing through the center 501 of the light blocking element 500, respectively. Hence, the complexity of the design of the mold can be decreased, and the forming accuracy of the light blocking element 500 can also be increased.

FIG. 8A is a schematic view of the first surface 610 of an optical element 600 according to the 6th embodiment of the present disclosure. FIG. 8B is a schematic view of the second surface 620 of the optical element 600 according to the 6th embodiment in FIG. 8A. FIG. 8C is a cross-sectional view of the optical element 600 according to the 6th embodiment of FIG. 8A. In FIG. 8A, the optical element 600 is an imaging lens element. The optical element 600 includes a first surface 610, a second surface 620 and an outer annular surface 640. The second surface 620 is corresponding to the first surface 610. The outer annular surface 640 connects an edge of the first surface 610 and an edge of the second surface 620.

In FIGS. 8A and 8B, the outer annular surface 640 includes three notches 641 and three arc surfaces 643 (N=3), wherein the three notches 641 are disposed on the outer annular surface 640, the three arc surfaces 643 are located on the outer annular surface 640, the three notches 641 and the three arc surfaces 643 are alternately arranged on the outer annular surface 640. The three arc surface 643 are coaxial and have different arc lengths (according to the 6th embodiment, each arc center of the arc surfaces 643 is a center 601, and the central axis X of the optical element 600 passes through the center 601 which is on the first surface 610 and the second surface 620), that is, the three notches 641 are asymmetrically disposed on the outer annular surface 640, so that the arc surfaces 643 alternately arranged between each two notches 641 has different arc lengths. Therefore, it is favorable for judging a correct assembling direction, thus the optical element 600 in the present disclosure can prevent a miss assembling in the assembling process. In the 6th embodiment of the present disclosure, each of the arc lengths of the three arc surfaces 643 is 0.60 mm, 6.88 mm and 10.03 mm.

According to the 6th embodiment, a virtual outer circular arc line 642 is formed between two ends of each of the notches 641, the virtual outer circular arc lines 642 are coaxial (according to the 6th embodiment, each arc center of the virtual outer circular arc lines 642 is the center 601), wherein, in FIG. 8A, there is a connecting line which is formed between each middle point of two virtual outer circular arc lines 642 of two notches 641 passing through the center 601 of the optical element 600, an angle between a middle point of the virtual outer circular arc line 642 of the other notch 641 and the middle point of the virtual outer circular arc line 642 of one of the two notches 641 which is near to the other notch 641 is θ, θ=45 degrees.

According to the 6th embodiment, the three notches 641 are straight cutting notches. That is, each notch 641 is formed into planar on the outer annular surface 640, and is formed into a straight edge on the first surface 610 and the second surface 620, respectively. A maximal depth of each of the notches 641 is d (that is, a maximal distance from the middle point of the virtual outer circular arc line 642 of each notch 641 extends to the outer annular surface 640), the contours of the notches 641 are the same, the maximal depths d of the notches 641 are also the same, d=0.2 mm.

Figure 9A:
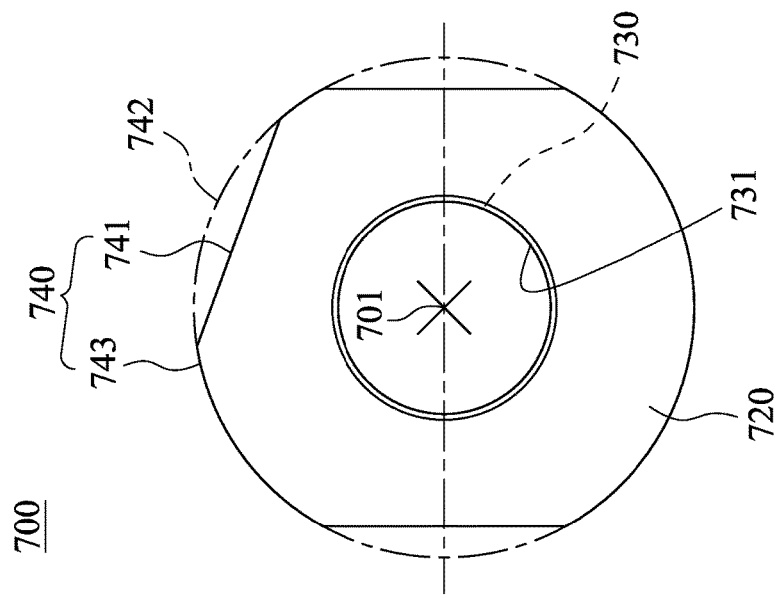
FIG. 9A is a schematic view of the first surface of a light blocking sheet according to the 7th embodiment of the present disclosure.

FIG. 9A is a schematic view of the first surface 710 of a light blocking sheet 700 according to the 7th embodiment of the present disclosure. FIG. 9B is a schematic view of the second surface 720 of the light blocking sheet 700 according to the 7th embodiment in FIG. 9A. In FIGS. 9A and 9B, the light blocking sheet 700 includes a first surface 710, a second surface 720, an inner annular surface 730 and an outer annular surface 740. The second surface 720 is corresponding to the first surface 710. The inner annular surface 730 connects the first surface 710 and the second surface 720, and forms an inner opening 731. The outer annular surface 740 connects an edge of the first surface 710 and an edge of the second surface 720.

In FIGS. 9A and 9B, the outer annular surface 740 includes three notches 741 and three arc surfaces 743 (N=3), wherein the three notches 741 are disposed on the outer annular surface 740, the three arc surfaces 743 are located on the outer annular surface 740, the three notches 741 and the three arc surfaces 743 are alternately arranged on the outer annular surface 740. The three arc surfaces 743 are coaxial and have different arc lengths (according to the 7th embodiment, each arc center of the arc surfaces 743 is a center 701), that is, the three notches 741 are asymmetrically disposed on the outer annular surface 740, so that the arc surfaces 743 alternately arranged between each two notches 741 has different arc lengths. Therefore, it is favorable for judging a correct assembling direction, thus the light blocking sheet 700 in the present disclosure can prevent a miss assembling in the assembling process. In the 7th embodiment of the present disclosure, each of the arc lengths of the three arc surfaces 743 is 0.25 mm, 1.09 mm and 2.56 mm.

According to the 7th embodiment, a virtual outer circular arc line 742 is formed between two ends of each of the notches 741, the virtual outer circular arc lines 742 are coaxial (according to the 7th embodiment, each arc center of the virtual outer circular arc lines 742 is the center 701), wherein, in FIG. 9A, there is a connecting line which is formed between each middle point of two virtual outer circular arc lines 742 of two notches 741 passing through the center 701 of the light blocking sheet 700, an angle between a middle point of the virtual outer circular arc line 742 of the other notch 741 and the middle point of the virtual outer circular arc line 742 of one of the two notches 741 which is near to the other notch 741 is θ, θ=70 degrees.

According to the 7th embodiment, the three notches 741 are straight cutting notches. That is, each notch 741 is formed into planar on the outer annular surface 740, and is formed into a straight edge on the first surface 710 and the second surface 720, respectively. A maximal depth of each of the notches 741 is d (that is, a maximal distance from the middle point of the virtual outer circular arc line 742 of each notch 741 extends to the outer annular surface 740), the contours of the notches 741 are the same, the maximal depths d of the notches 741 are also the same, d=0.15 mm.

Figure 9C:
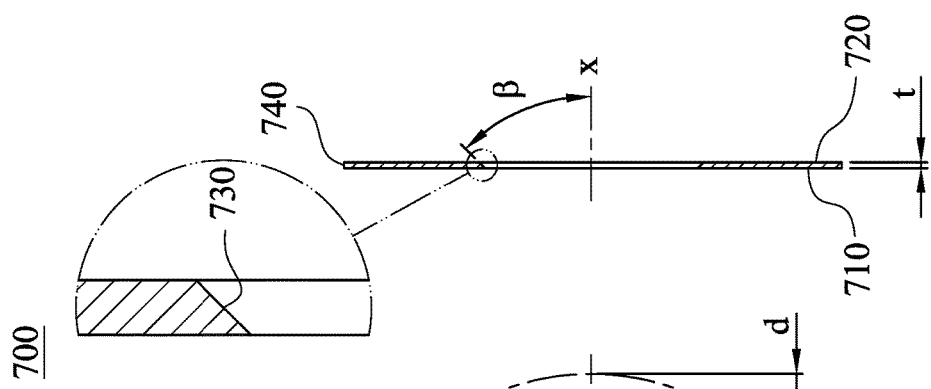
FIG. 9C is a cross-sectional view of the light blocking sheet according to the 7th embodiment of FIG. 9A.
Figure 9B:
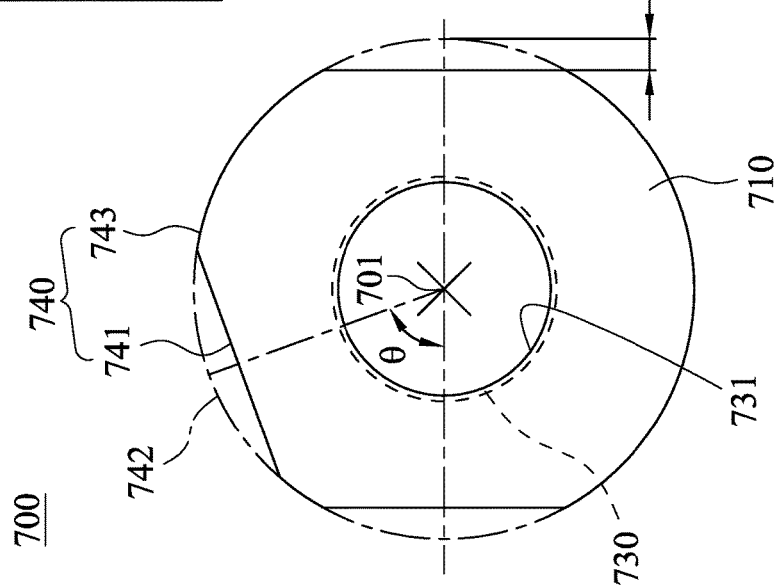
FIG. 9B is a schematic view of the second surface of the light blocking sheet according to the 7th embodiment in FIG. 9A.

FIG. 9C is a cross-sectional view of the light blocking sheet 700 according to the 7th embodiment of FIG. 9A. In FIG. 9C, according to the 7th embodiment of the present disclosure, a thickness of the light blocking sheet 700 is t, and t=0.03 mm.

In FIG. 9C, according to the 7th embodiment of the present disclosure, an angle between an extending direction of the inner annular surface 730 and an extending direction of a central axis X of the light blocking element 700 is β, and β=45 degrees.

Figure 10:
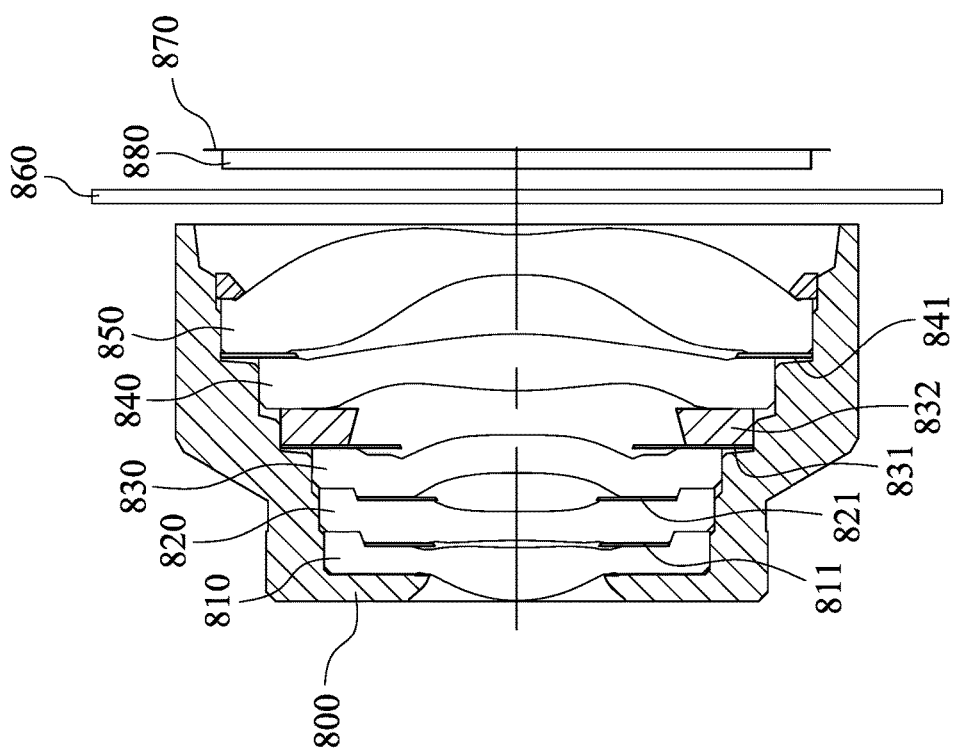
FIG. 10 is a schematic view of a lens module according to the 8th embodiment of the present disclosure.

FIG. 10 is a schematic view of a lens module 10 according to the 8th embodiment of the present disclosure. According to the 8th embodiment, the lens module 10 includes an imaging lens assembly (not shown) and an image sensor 880, wherein the imaging lens assembly includes a barrel 800, a lens element set (not shown), an IR-cut filter 860 and a image surface 870. The lens element set is located in the barrel 800, the IR-cut filter 860 and the image surface 870 are located on an image side of the lens element set in order, and the image sensor 880 is disposed on the image surface 870.

According to the 8th embodiment, the lens element set includes, in order from an object side to the image side, a first lens element 810, a first optical element 811, a second lens element 820, a second optical element 821, a third lens element 830, a third optical element 831, a fourth optical element 832, a fourth lens element 840, a fifth optical element 841 and a fifth lens element 850, wherein the first lens element 810, the second lens element 820, the third lens element 830, the fourth lens element 840 and the fifth lens element 850 can be the optical element which is disclosed in the aforementioned 6th embodiment, that is, the imaging lens element can prevent a miss assembling in the assembling process. The first optical element 811, the second optical element 821, the third optical element 831, the fourth optical element 832 and the fifth optical element 841 can be the optical element which is disclosed in any one of the aforementioned 1st to 5th, and 7th embodiments. In detail, each of the first optical element 811, the second optical element 821, the third optical element 831 and the fifth optical element 841 is any one light blocking sheet of the 1st embodiment, the 2nd embodiment, the 3rd embodiment, the 4th embodiment and the 7th embodiment, the fourth optical element 832 is the light blocking element (spacer) of the 5th embodiment, and will not be limited thereof. Therefore, the manufacturing yield rate and the image quality can be increased by assembling optical elements in a correct way, so that the effect on the image quality from the stray light can be reduced.

Table 1 shows data of each lens element (810, 820, 830, 840, 850), the IR-cut filter 860 and the image surface 870, wherein the curvature radius, the thickness and the focal length are shown in millimeters (mm), and surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order.

TABLE 1

8th Embodiment
f = 3.17 mm, Fno = 2.26, HFOV = 42.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.201000 | | | | |
| 2 | Lens 1 | 1.126 | ASP | 0.424000 | Plastic | 1.544 | 56.0 | 2.58 |
| 3 | | 4.933 | ASP | 0.056000 | | | | |
| 4 | Lens 2 | −8.762 | ASP | 0.232000 | Plastic | 1.660 | 20.4 | −9.09 |
| 5 | | 19.192 | ASP | 0.309000 | | | | |
| 6 | Lens 3 | −7.618 | ASP | 0.303000 | Plastic | 1.544 | 56.0 | −15.53 |
| 7 | | −78.511 | ASP | 0.354000 | | | | |
| 8 | Lens 4 | 3.304 | ASP | 0.459000 | Plastic | 1.534 | 45.3 | 3.12 |
| 9 | | −3.200 | ASP | 0.472000 | | | | |
| 10 | Lens 5 | −2.868 | ASP | 0.320000 | Plastic | 1.544 | 56.0 | −2.09 |
| 11 | | 1.951 | ASP | 0.250000 | | | | |
| 12 | IR-cut filter | Plano | | 0.110000 | Glass | 1.517 | 64.2 | — |
| 13 | | Plano | | 0.317189 | | | | |
| 14 | Image | Plano | | — | | | | |

Reference wavelength is 587.6 nm (d-line).

TABLE 2

Aspheric Coefficients

| Surface # | 2 | 3 | 4 | 5 | 6 |
|---|---|---|---|---|---|
| k = | −3.4877E+00 | −1.6277E+01 | −2.8744E+01 | 5.9497E+01 | −9.8999E+01 |
| A4 = | 2.6592E−01 | −2.4679E−01 | −1.7788E−01 | 6.0773E−02 | −6.0353E−01 |
| A6 = | −6.7165E−02 | −5.2422E−01 | 6.9068E−01 | 1.0087E+00 | 1.6035E+00 |
| A8 = | −4.3283E−01 | 2.8278E+00 | 1.4463E−01 | −9.7445E−01 | −7.0008E+00 |
| A10 = | 8.7853E−01 | −5.7696E+00 | −1.4589E+00 | 6.6191E−01 | 1.8586E+01 |
| A12 = | −1.8386E+00 | 3.7863E+00 | 1.7466E+00 | 6.3247E−01 | −2.4381E+01 |
| A14 = | | | | | 1.2677E+01 |

| Surface # | 7 | 8 | 9 | 10 | 11 |
|---|---|---|---|---|---|
| k = | −9.8997E+01 | −1.6040E+00 | −3.0334E+01 | −6.7384E−01 | −2.0802E+01 |
| A4 = | −5.3400E−01 | −9.8591E−02 | −2.9705E−02 | −4.7129E−01 | −2.0813E−01 |
| A6 = | 7.3794E−01 | 5.2380E−02 | 9.5658E−02 | 4.5535E−01 | 1.4668E−01 |
| A8 = | −1.6259E+00 | −1.2799E−01 | −1.1032E−01 | −1.9593E−01 | −6.2385E−02 |
| A10 = | 2.3264E+00 | 9.1951E−02 | 6.2581E−02 | 5.0618E−02 | 1.5997E−02 |
| A12 = | −1.3544E+00 | −2.7488E−02 | −1.8643E−02 | −8.5697E−03 | −2.5513E−03 |
| A14 = | 2.5963E−01 | 3.8219E−03 | 2.7781E−03 | 9.2119E−04 | 2.4242E−04 |
| A16 = | | −2.1567E−04 | −1.6281E−04 | −4.8198E−05 | −1.0583E−05 |

Figure 11:
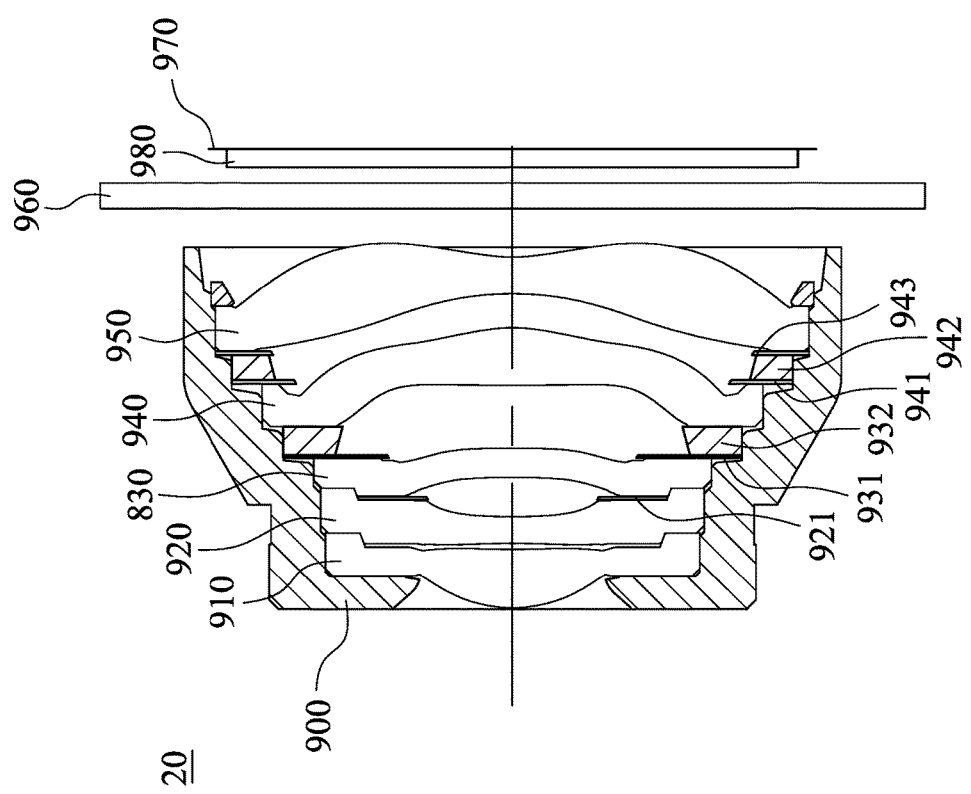
FIG. 11 is a schematic view of a lens module according to the 9th embodiment of the present disclosure.

FIG. 11 is a schematic view of a lens module 20 according to the 9th embodiment of the present disclosure. According to the 9th embodiment, the lens module 20 includes an imaging lens assembly (not shown) and an image sensor 980, wherein the imaging lens assembly includes a barrel 900, a lens element set (not shown), an IR-cut filter 960 and a image surface 970. The lens element set is located in the barrel 900, the IR-cut filter 960 and the image surface 970 are located on an image side of the lens element set in order, and the image sensor 980 is disposed on the image surface 970.

According to the 9th embodiment, the lens element set includes, in order from an object side to the image side, a first lens element 910, a second lens element 920, a first optical element 921, a third lens element 930, a second optical element 931, a third optical element 932, a fourth lens element 940, a fourth optical element 941, a fifth optical element 942, a sixth optical element 943 and a fifth lens element 950, wherein the first lens element 910, the second lens element 920, the third lens element 930, the fourth lens element 940 and the fifth lens element 950 can be the optical element which is disclosed in the aforementioned 6th embodiment, that is, the imaging lens element can prevent a miss assembling in the assembling process. The first optical element 921, the second optical element 931, the third optical element 932, the fourth optical element 941, the fifth optical element 942 and the sixth optical element 943 can be the optical element which is disclosed in any one of the aforementioned 1st to 5th, and 7th embodiments. In detail, each of the first optical element 921, the second optical element 931, the fourth optical element 941 and the sixth optical element 943 is any one light blocking sheet of the 1st embodiment, the 2nd embodiment, the 3rd embodiment, the 4th embodiment and the 7th embodiment, the third optical element 932 and the fifth optical element 942 are the light blocking element (spacer) of the 5th embodiment, and will not be limited thereof. Therefore, the manufacturing yield rate and the image quality can be increased by assembling optical elements in a correct way, so that the effect on the image quality from the stray light can be reduced.

Table 3 shows data of each lens element (910, 920, 930, 940, 950), the IR-cut filter 960 and the image surface 970, wherein the curvature radius, the thickness and the focal length are shown in millimeters (mm), and surface numbers 0-14 represent the surfaces sequentially arranged from the object-side to the image-side along the optical axis. In Table 4, k represents the conic coefficient of the equation of the aspheric surface profiles. A4-A16 represent the aspheric coefficients ranging from the 4th order to the 16th order.

TABLE 3

9th Embodiment
f = 3.46 mm, Fno = 2.25, HFOV = 39.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.278000 | | | | |
| 2 | Lens 1 | 1.141 | ASP | 0.487000 | Plastic | 1.544 | 55.9 | 2.37 |
| 3 | | 8.509 | ASP | 0.048000 | | | | |
| 4 | Lens 2 | −10.898 | ASP | 0.220000 | Plastic | 1.639 | 23.5 | −5.31 |
| 5 | | 4.965 | ASP | 0.323000 | | | | |
| 6 | Lens 3 | −18.414 | ASP | 0.241000 | Plastic | 1.639 | 23.5 | −115.82 |
| 7 | | −24.639 | ASP | 0.520000 | | | | |
| 8 | Lens 4 | −93.665 | ASP | 0.473000 | Plastic | 1.544 | 55.9 | 2.54 |
| 9 | | −1.365 | ASP | 0.280000 | | | | |

TABLE 3-continued

9th Embodiment
f = 3.46 mm, Fno = 2.25, HFOV = 39.9 deg.

| Surface # | | Curvature Radius | | Thickness | Material | Index | Abbe # | Focal Length |
|---|---|---|---|---|---|---|---|---|
| 10 | Lens 5 | −2.725 | ASP | 0.307000 | Plastic | 1.544 | 55.9 | −1.74 |
| 11 | | 1.514 | ASP | 0.400000 | | | | |
| 12 | IR-cut filter | Plano | | 0.210000 | Glass | 1.517 | 64.2 | — |
| 13 | | Plano | | 0.274721 | | | | |
| 14 | Image | Plano | | — | | | | |

Reference wavelength is 587.6 nm (d-line).

TABLE 4

Aspheric Coefficients

| | Surface # | | | | |
|---|---|---|---|---|---|
| | 2 | 3 | 4 | 5 | 6 |
| k = | −3.4401E+00 | 1.4225E−01 | −8.2890E+01 | 2.6351E+01 | −9.9000E+01 |
| A4 = | 2.7519E−01 | −1.4417E−01 | −1.0143E−01 | 4.5345E−02 | −2.9326E−01 |
| A6 = | −4.6596E−02 | −5.6288E−01 | 1.5292E−01 | 5.6853E−01 | −3.5114E−01 |
| A8 = | −1.6721E−01 | 4.0542E+00 | 2.0008E+00 | −3.6852E−01 | 2.1298E+00 |
| A10 = | −7.5102E−02 | −9.6210E+00 | −5.3044E+00 | −2.7012E−01 | −5.6164E+00 |
| A12 = | 1.2757E+00 | 9.1258E+00 | 4.0508E+00 | 1.3056E+00 | 8.3818E+00 |
| A14 = | −1.8902E+00 | −3.1352E+00 | | | −4.8602E+00 |

| | Surface # | | | | |
|---|---|---|---|---|---|
| | 7 | 8 | 9 | 10 | 11 |
| k = | −8.9496E+01 | −9.9000E+01 | −1.0520E+01 | 2.4732E−02 | −1.3000E+01 |
| A4 = | −2.7674E−01 | 7.1448E−02 | −1.9396E−02 | −3.5725E−02 | −1.1909E−01 |
| A6 = | 3.5663E−02 | −9.1146E−02 | 3.8136E−01 | 2.0099E−02 | 6.5475E−02 |
| A8 = | 2.2566E−01 | 1.7478E−02 | −5.7576E−01 | 2.6136E−02 | −3.0014E−02 |
| A10 = | −6.4965E−01 | −8.6317E−02 | 3.8303E−01 | −2.0246E−02 | 8.8658E−03 |
| A12 = | 1.2484E+00 | 6.9063E−02 | −1.3509E−01 | 5.8090E−03 | −1.5685E−03 |
| A14 = | −6.8854E−01 | −1.4041E−02 | 2.4499E−02 | −7.7133E−04 | 1.4933E−04 |
| A16 = | | | −1.7942E−03 | 3.9767E−05 | −5.7209E−06 |

Figure 12:
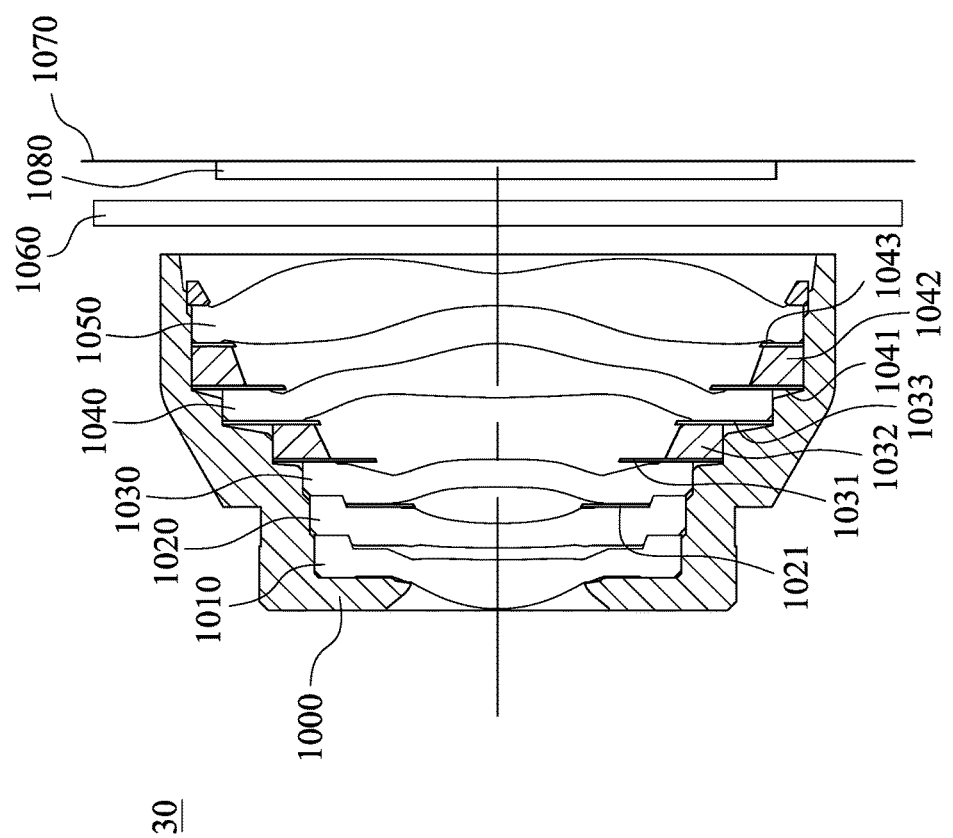
FIG. 12 is a schematic view of a lens module according to the 10th embodiment of the present disclosure.

FIG. 12 is a schematic view of a lens module 30 according to the 10th embodiment of the present disclosure. According to the 10th embodiment, the lens module 30 includes an imaging lens assembly (not shown) and an image sensor 1080, wherein the imaging lens assembly includes a barrel 1000, a lens element set (not shown), an IR-cut filter 1060 and a image surface 1070. The lens element set is located in the barrel 1000, the IR-cut filter 1060 and the image surface 1070 are located on an image side of the lens element set in order, and the image sensor 1080 is disposed on the image surface 1070.

According to the 10th embodiment, the lens element set includes, in order from an object side to the image side, a first lens element 1010, a second lens element 1020, a first optical element 1021, a third lens element 1030, a second optical element 1031, a third optical element 1032, a fourth optical element 1033, a fourth lens element 1040, a fifth optical element 1041, a sixth optical element 1042, a seventh optical element 1043 and a fifth lens element 1050, wherein the first lens element 1010, the second lens element 1020, the third lens element 1030, the fourth lens element 1040 and the fifth lens element 1050 can be the optical element which is disclosed in the aforementioned 6th embodiment, that is, the imaging lens element can prevent a miss assembling in the assembling process. The first optical element 1021, the second optical element 1031, the third optical element 1032, the fourth optical element 1033, the fifth optical element 1041, the sixth optical element 1042 and the seventh optical element 1043 can be the optical element which is disclosed in any one of the aforementioned 1st to 5th, and 7th embodiments. In detail, each of the first optical element 1021, the second optical element 1031, the fourth optical element 1033, the fifth optical element 1041 and the seventh optical element 1043 is any one light blocking sheet of the 1st embodiment, the 2nd embodiment, the 3rd embodiment, the 4th embodiment and the 7th embodiment, the third optical element 1032 and the sixth optical element 1042 are the light blocking element (spacer) of the 5th embodiment, and will not be limited thereof. Therefore, the manufacturing yield rate and the image quality can be increased by assembling optical elements in a correct way, so that the effect on the image quality from the stray light can be reduced.

Table 5 shows data of each lens element (1010, 1020, 1030, 1040, 1050), the IR-cut filter 1060 and the image surface 1070, wherein the curvature radius, the thickness and the focal length are shown in millimeters (mm), and surface numbers 0-14 represent the surfaces sequentially arranged from the object-side to the image-side along the optical axis. In Table 6, k represents the conic coefficient of the equation of the aspheric surface profiles. A4-A16 represent the aspheric coefficients ranging from the 4th order to the 16th order.

TABLE 5

10th Embodiment
f = 3.30 mm, Fno = 2.28, HFOV = 40.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.224000 | | | | |
| 2 | Lens 1 | 1.226 | ASP | 0.412000 | Plastic | 1.544 | 55.9 | 2.63 |
| 3 | | 7.602 | ASP | 0.101000 | | | | |
| 4 | Lens 2 | 10.744 | ASP | 0.205000 | Plastic | 1.661 | 20.4 | −5.86 |
| 5 | | 2.825 | ASP | 0.306000 | | | | |
| 6 | Lens 3 | −13.901 | ASP | 0.233000 | Plastic | 1.661 | 20.4 | −52.54 |
| 7 | | −23.338 | ASP | 0.524000 | | | | |
| 8 | Lens 4 | 11.306 | ASP | 0.453000 | Plastic | 1.544 | 55.9 | 2.13 |
| 9 | | −1.273 | ASP | 0.318000 | | | | |
| 10 | Lens 5 | −3.636 | ASP | 0.271000 | Plastic | 1.544 | 55.9 | −1.69 |
| 11 | | 1.261 | ASP | 0.400000 | | | | |
| 12 | IR-cut filter | Plano | | 0.210000 | Glass | 1.517 | 64.2 | — |
| 13 | | Plano | | 0.331961 | | | | |
| 14 | Image | Plano | | — | | | | |

Reference wavelength is 587.6 nm (d-line).

TABLE 6

Aspheric Coefficients

| | Surface # | | | | |
|---|---|---|---|---|---|
| | 2 | 3 | 4 | 5 | 6 |
| k = | −2.7802E−01 | 2.4592E+00 | −8.9637E+01 | −1.8997E+00 | 2.0000E+01 |
| A4 = | 7.5762E−03 | −1.3668E−01 | −1.3286E−01 | −6.2324E−02 | −3.9979E−01 |
| A6 = | −2.0732E−02 | 1.2707E−01 | 5.6211E−01 | 6.7337E−01 | 8.9943E−02 |
| A8 = | 8.1550E−02 | 2.8112E−01 | 3.1724E−02 | −4.8487E−01 | 4.4677E−01 |
| A10 = | −6.9242E−01 | −1.6619E+00 | −1.6589E+00 | 1.7913E−01 | −1.5839E+00 |
| A12 = | 1.5115E+00 | 1.7795E+00 | 1.6245E+00 | 2.8255E−01 | 2.8836E+00 |
| A14 = | −1.6600E+00 | −7.9517E−01 | | | −1.5670E+00 |

| | Surface # | | | | |
|---|---|---|---|---|---|
| | 7 | 8 | 9 | 10 | 11 |
| k = | −8.9496E+01 | −6.2087E+01 | −8.6987E+00 | −8.7613E+00 | −1.1174E+01 |
| A4 = | −2.7674E−01 | 2.4986E−02 | −9.5913E−02 | −3.0705E−01 | −1.8423E−01 |
| A6 = | 3.5663E−02 | −1.9786E−02 | 3.4374E−01 | 3.6024E−01 | 1.4821E−01 |
| A8 = | 2.2566E−01 | −4.3640E−02 | −3.2650E−01 | −1.8130E−01 | −7.4451E−02 |
| A10 = | −6.4965E−01 | 2.2074E−02 | 1.5559E−01 | 5.0197E−02 | 2.2964E−02 |
| A12 = | 1.2484E+00 | −1.0922E−03 | −4.2398E−02 | −7.9930E−03 | −4.2803E−03 |
| A14 = | −6.8854E−01 | −4.7323E−04 | 6.3123E−03 | 6.9220E−04 | 4.3800E−04 |
| A16 = | | | −3.9396E−04 | −2.5434E−05 | −1.8651E−05 |

Figure 13:
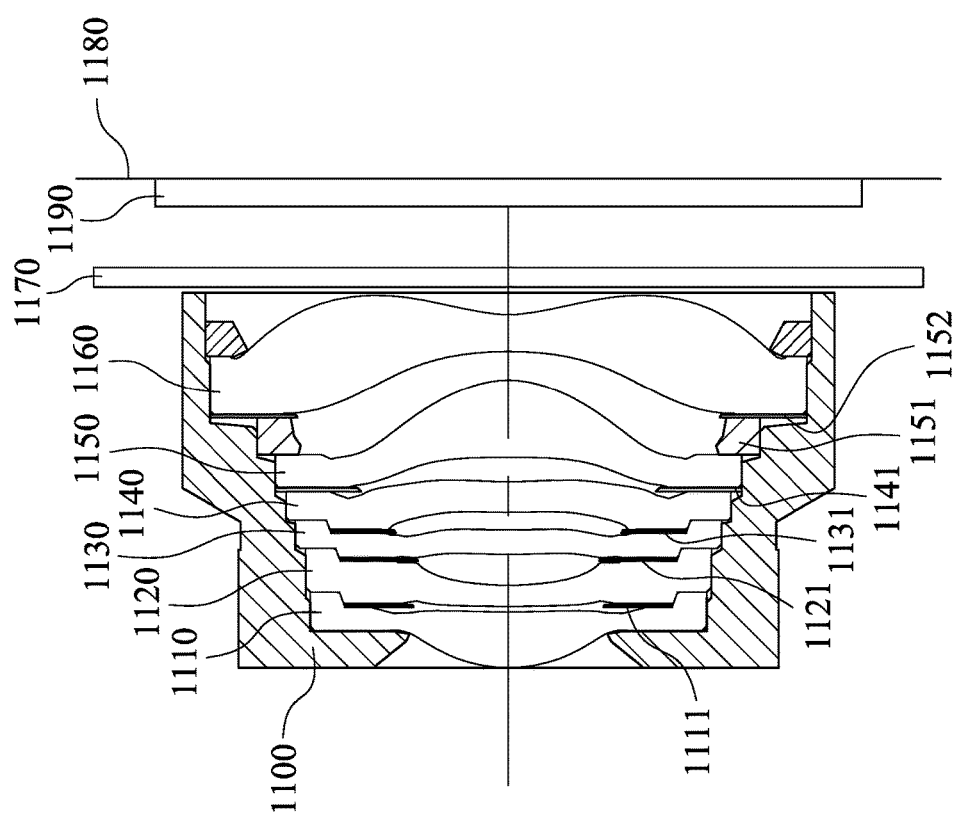
FIG. 13 is a schematic view of a lens module according to the 11th embodiment of the present disclosure.

FIG. 13 is a schematic view of a lens module 40 according to the 11th embodiment of the present disclosure. According to the 11th embodiment, the lens module 40 includes an imaging lens assembly (not shown) and an image sensor 1190, wherein the imaging lens assembly includes a barrel 1100, a lens element set (not shown), an IR-cut filter 1170 and a image surface 1180. The lens element set is located in the barrel 1100, the IR-cut filter 1170 and the image surface 1180 are located on an image side of the lens element set in order, and the image sensor 1190 is disposed on the image surface 1180.

According to the 11th embodiment, the lens element set includes, in order from an object side to the image side, a first lens element 1110, a first optical element 1111, a second lens element 1120, a second optical element 1121, a third lens element 1130, a third optical element 1131, a fourth lens element 1140, a fourth optical element 1141, a fifth lens element 1150, a fifth optical element 1151, a sixth optical element 1152 and a sixth lens element 1160, wherein the first lens element 1110, the second lens element 1120, the third lens element 1130, the fourth lens element 1140, the fifth lens element 1150 and the sixth lens element 1160 can be the optical element which is disclosed in the aforementioned 6th embodiment, that is, the imaging lens element can prevent a miss assembling in the assembling process. The first optical element 1111, the second optical element 1121, the third optical element 1131, the fourth optical element 1141, the fifth optical element 1151 and the sixth optical element 1152 can be the optical element which is disclosed in any one of the aforementioned 1st to 5th, and 7th embodiments. In detail, each of the first optical element 1111, the second optical element 1121, the third optical element 1131, the fourth optical element 1141 and the sixth optical element 1152 is any one light blocking sheet of the 1st embodiment, the 2nd embodiment, the 3rd embodiment, the 4th embodiment and the 7th embodiment, the fifth optical element 1151 is the light blocking element (spacer) of the 5th embodiment, and will not be limited thereof. Therefore, the manufacturing yield rate and the image quality can be increased by assembling optical elements in a correct way, so that the effect on the image quality from the stray light can be reduced.

Table 7 shows data of each lens element (1110, 1120, 1130, 1140, 1150, 1160), the IR-cut filter 1170 and the image surface 1180, wherein the curvature radius, the thickness and the focal length are shown in millimeters (mm), and surface numbers 0-16 represent the surfaces sequentially arranged from the object-side to the image-side along the optical axis. In Table 8, k represents the conic coefficient of the equation of the aspheric surface profiles. A4-A16 represent the aspheric coefficients ranging from the 4th order to the 16th order.

imaging lens assembly (not shown) and an image sensor 1280, wherein the imaging lens assembly includes a barrel 1200, a lens element set (not shown), an IR-cut filter 1260 and a image surface 1270. The lens element set is located in the barrel 1200, the IR-cut filter 1260 and the image surface 1270 are located on an image side of the lens element set in order, and the image sensor 1280 is disposed on the image surface 1270.

According to the 12th embodiment, the lens element set includes, in order from an object side to the image side, a first lens element 1210, a first optical element 1211, a second lens element 1220, a second optical element 1221, a third lens element 1230, a third optical element 1231, a fourth lens element 1240, a fourth optical element 1241, a fifth optical

TABLE 7

11th Embodiment
f = 4.06 mm, Fno = 1.89, HFOV = 39.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.367000 | | | | |
| 2 | Lens 1 | 1.592 | ASP | 0.605000 | Plastic | 1.544 | 55.9 | 3.48 |
| 3 | | 8.629 | ASP | 0.059000 | | | | |
| 4 | Lens 2 | 10.098 | ASP | 0.230000 | Plastic | 1.639 | 23.5 | −8.05 |
| 5 | | 3.377 | ASP | 0.336000 | | | | |
| 6 | Lens 3 | 8.537 | ASP | 0.265000 | Plastic | 1.544 | 55.9 | 59.80 |
| 7 | | 11.446 | ASP | 0.190000 | | | | |
| 8 | Lens 4 | 6.931 | ASP | 0.330000 | Plastic | 1.639 | 23.5 | −15.78 |
| 9 | | 4.032 | ASP | 0.266000 | | | | |
| 10 | Lens 5 | −25.689 | ASP | 0.841000 | Plastic | 1.544 | 55.9 | 2.12 |
| 11 | | −1.115 | ASP | 0.312000 | | | | |
| 12 | Lens 6 | −4.059 | ASP | 0.400000 | Plastic | 1.535 | 55.7 | −1.99 |
| 13 | | 1.490 | ASP | 0.300000 | | | | |
| 14 | IR-cut filter | Plano | | 0.210000 | Glass | 1.517 | 64.2 | — |
| 15 | | Plano | | 0.662061 | | | | |
| 16 | Image | Plano | | — | | | | |

Reference wavelength is 587.6 nm (d-line).

TABLE 8

Aspheric Coefficients

| | Surface # | | | | | |
|---|---|---|---|---|---|---|
| | 2 | 3 | 4 | 5 | 6 | 7 |
| k = | −1.1795E+00 | −8.9989E+01 | −7.5442E+01 | −4.1022E+00 | −4.7206E+01 | −9.0000E+01 |
| A4 = | 2.1298E−02 | −6.9842E−02 | −1.0219E−01 | −1.1451E−01 | −3.0841E−02 | −9.2301E−02 |
| A6 = | 7.7177E−02 | 5.3215E−02 | 2.1150E−01 | 1.1799E−01 | −2.4006E−01 | −2.2449E−02 |
| A8 = | −1.6295E−01 | 1.7503E−02 | −1.5382E−01 | 1.3266E−02 | 5.5023E−01 | 9.8410E−02 |
| A10 = | 1.7349E−01 | −8.7151E−02 | 5.7102E−02 | −1.8583E−01 | −9.1365E−01 | −3.5363E−01 |
| A12 = | −9.0071E−02 | 5.4939E−02 | 2.1322E−02 | 2.7648E−01 | 7.5321E−01 | 4.4435E−01 |
| A14 = | 7.6662E−03 | −1.5081E−02 | −1.4843E−02 | −1.0075E−01 | −2.0675E−01 | −2.0262E−01 |
| A16 = | | | | | | 3.0196E−02 |

| | Surface # | | | | | |
|---|---|---|---|---|---|---|
| | 8 | 9 | 10 | 11 | 12 | 13 |
| k = | −1.0000E+00 | −2.7947E+01 | −9.7365E+00 | −3.9399E+00 | −3.6213E+01 | −8.7875E+00 |
| A4 = | −2.7717E−01 | −2.3007E−01 | −1.1707E−01 | −9.4597E−02 | −9.5534E−02 | −6.2164E−02 |
| A6 = | 3.8715E−01 | 3.2435E−01 | 9.0921E−02 | 6.2733E−02 | 2.8327E−02 | 2.2504E−02 |
| A8 = | −5.5802E−01 | −4.2197E−01 | −1.1243E−01 | −5.0030E−02 | −3.5414E−03 | −6.6427E−03 |
| A10 = | 4.8133E−01 | 3.5584E−01 | 8.0011E−02 | 2.6594E−02 | 5.2867E−04 | 1.2779E−03 |
| A12 = | −1.8717E−01 | −1.6503E−01 | −2.6434E−02 | −6.2988E−03 | −1.1796E−04 | −1.4986E−04 |
| A14 = | 1.9752E−02 | 3.8612E−02 | 4.0061E−03 | 6.0335E−04 | 1.4254E−05 | 9.5108E−06 |
| A16 = | 1.8695E−03 | −3.6026E−03 | −2.2716E−04 | −1.6218E−05 | −6.2513E−07 | −2.4454E−07 |

Figure 14:
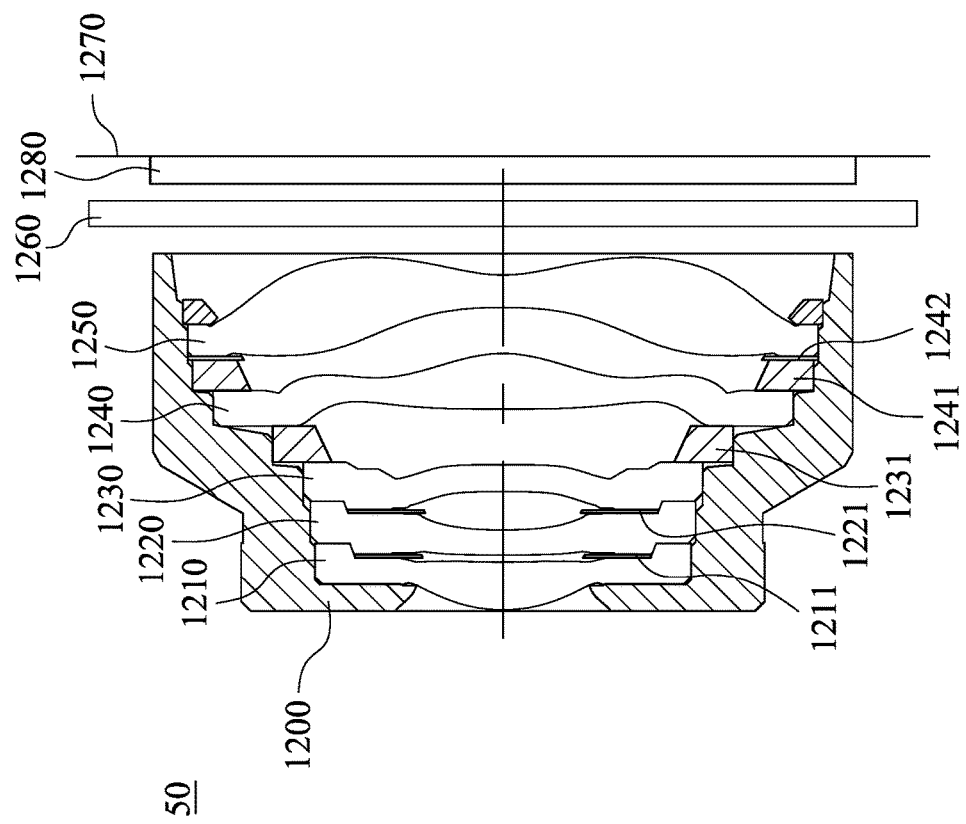
FIG. 14 is a schematic view of a lens module according to the 12th embodiment of the present disclosure.

FIG. 14 is a schematic view of a lens module 50 according to the 12th embodiment of the present disclosure. According to the 12th embodiment, the lens module 50 includes an element 1242 and a fifth lens element 1150, wherein the first lens element 1210, the second lens element 1220, the third lens element 1230, the fourth lens element 1240 and the fifth lens element 1250 can be the optical element which is disclosed in the aforementioned 6th embodiment, that is, the imaging lens element can prevent a miss assembling in the assembling process. The first optical element 1211, the second optical element 1221, the third optical element 1231, the fourth optical element 1241 and the fifth optical element 1242 can be the optical element which is disclosed in any one of the aforementioned 1st to 5th, and 7th embodiments. In detail, each of the first optical element 1211, the second optical element 1221 and the fifth optical element 1242 is any one light blocking sheet of the 1st embodiment, the 2nd embodiment, the 3rd embodiment, the 4th embodiment and the 7th embodiment, the third optical element 1231 and the fourth optical element 1241 are the light blocking element (spacer) of the 5th embodiment, and will not be limited thereof. Therefore, the manufacturing yield rate and the image quality can be increased by assembling optical elements in a correct way, so that the effect on the image quality from the stray light can be reduced.

Table 9 shows data of each lens element (1210, 1220, 1230, 1240, 1250), the IR-cut filter 1260 and the image surface 1270, wherein the curvature radius, the thickness and the focal length are shown in millimeters (mm), and surface numbers 0-14 represent the surfaces sequentially arranged from the object-side to the image-side along the optical axis. In Table 8, k represents the conic coefficient of the equation of the aspheric surface profiles. A4-A16 represent the aspheric coefficients ranging from the 4th order to the 16th order.

TABLE 9

12th Embodiment
f = 3.21 mm, Fno = 2.26, HFOV = 41.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.204000 | | | | |
| 2 | Lens 1 | 1.240 | ASP | 0.397000 | Plastic | 1.544 | 56.0 | 2.76 |
| 3 | | 6.319 | ASP | 0.058000 | | | | |
| 4 | Lens 2 | 8.006 | ASP | 0.205000 | Plastic | 1.660 | 20.4 | −7.01 |
| 5 | | 2.902 | ASP | 0.316000 | | | | |
| 6 | Lens 3 | −45.910 | ASP | 0.220000 | Plastic | 1.584 | 28.2 | −23.16 |
| 7 | | 19.220 | ASP | 0.459000 | | | | |
| 8 | Lens 4 | −151.755 | ASP | 0.454000 | Plastic | 1.544 | 56.0 | 2.06 |
| 9 | | −1.111 | ASP | 0.379000 | | | | |
| 10 | Lens 5 | −4.014 | ASP | 0.270000 | Plastic | 1.535 | 55.8 | −1.74 |
| 11 | | 1.241 | ASP | 0.400000 | | | | |
| 12 | IR-cut filter | Plano | | 0.210000 | Glass | 1.517 | 64.2 | — |
| 13 | | Plano | | 0.364076 | | | | |
| 14 | Image | Plano | | — | | | | |

Reference wavelength is 587.6 nm (d-line).

TABLE 10

Aspheric Coefficients

| | Surface # | | | | |
|---|---|---|---|---|---|
| | 2 | 3 | 4 | 5 | 6 |
| k = | −1.1892E+00 | −7.4533E+01 | −3.5502E+01 | −6.8390E−01 | −9.9000E+01 |
| A4 = | 5.3844E−02 | −2.2876E−01 | −2.7687E−01 | −1.1270E−01 | −5.1592E−01 |
| A6 = | 3.9507E−02 | 2.5833E−01 | 1.0106E+00 | 9.8473E−01 | −7.6463E−02 |
| A8 = | 1.0139E−02 | 9.2638E−01 | −3.0991E−01 | −1.5074E+00 | 1.5587E+00 |
| A10 = | −1.2543E+00 | −3.8637E+00 | −1.5949E+00 | 2.4607E+00 | −5.3570E+00 |
| A12 = | 3.0469E+00 | 4.2028E+00 | 1.5374E+00 | −1.7457E+00 | 1.1053E+01 |
| A14 = | −2.9374E+00 | −1.7636E+00 | | | −7.3580E+00 |

| | Surface # | | | | |
|---|---|---|---|---|---|
| | 7 | 8 | 9 | 10 | 11 |
| k = | 2.0000E+01 | −9.9000E+01 | −6.1922E+00 | −1.7372E+00 | −9.0461E+00 |
| A4 = | −4.1502E−01 | 8.1247E−02 | −8.1004E−02 | −1.5573E−01 | −1.4612E−01 |
| A6 = | −2.1763E−02 | −2.2800E−03 | 3.7567E−01 | 8.8124E−02 | 9.1062E−02 |
| A8 = | 7.5187E−01 | −6.7899E−02 | −3.2979E−01 | −3.4093E−03 | −4.3716E−02 |
| A10 = | −2.1216E+00 | 5.5796E−02 | 1.4296E−01 | −7.8992E−03 | 1.4609E−02 |
| A12 = | 3.4616E+00 | −2.1596E−02 | −3.5043E−02 | 2.3075E−03 | −3.2094E−03 |
| A14 = | −1.7985E+00 | 3.1616E−03 | 4.6568E−03 | −2.5855E−04 | 3.9649E−04 |
| A16 = | | | −2.6576E−04 | 1.0377E−05 | −2.0122E−05 |

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A light blocking sheet, comprising:
a first surface;
a second surface corresponding to the first surface;
an inner annular surface connecting the first surface and the second surface, and forming an inner opening; and
an outer annular surface connecting an edge of the first surface and an edge of the second surface, and comprising:
at least three notches disposed on the outer annular surface; and
at least three arc surfaces located on the outer annular surface, wherein the at least three notches and the at least three arc surfaces are alternately arranged on the outer annular surface, and the at least three arc surfaces are coaxial and have different arc lengths;
wherein a maximal depth of each of the notches is d, and the following condition is satisfied:

0.03 mm<d≤0.15 mm;

wherein each of the at least three notches is singlet-symmetric and is formed into a single shape.

2. The light blocking sheet of claim 1, wherein a virtual outer circular arc line is formed between two ends of each of the notches, the virtual outer circular arc lines are coaxial, and there is only one connecting line which is formed between each middle point of any two virtual outer circular arc lines passing through a center of the light blocking sheet.

3. The light blocking sheet of claim 2, wherein a number of the notches is N, and the following condition is satisfied:

3≤N<8.

4. The light blocking sheet of claim 1, wherein contours of the notches are the same.

5. The light blocking sheet of claim 1, wherein the depths of the notches are the same.

6. The light blocking sheet of claim 1, wherein a thickness of the light blocking sheet is t, and the following condition is satisfied:

0.01 mm<t<0.10 mm.

7. The light blocking sheet of claim 1, wherein the inner opening is a punching hole.

8. The light blocking sheet of claim 1, wherein an angle between an extending direction of the inner annular surface and an extending direction of a central axis of the light blocking sheet is β, and the following condition is satisfied:

15 degrees<β<55 degrees.

9. The light blocking sheet of claim 1, wherein a number of the notches is N, and the following condition is satisfied:

N=3.

10. The light blocking sheet of claim 9, wherein a virtual outer circular arc line is formed between two ends of each of the notches, the virtual outer circular arc lines are coaxial;

wherein for the at least three notches, there is a connecting line which is formed between each middle point of the two virtual outer circular arc lines of two notches passing through a center of the light blocking sheet, and an angle between a middle point of the virtual outer circular arc line of the other notch and the middle point of one of the two virtual outer circular arc lines of the two notches which is near to the other notch is θ, and the following condition is satisfied:

20 degrees<θ<75 degrees.

11. An imaging lens assembly, comprising:
the light blocking sheet of claim 1.

12. A lens module, comprising:
the imaging lens assembly of claim 11; and
an image sensor, wherein the image sensor is disposed on an image surface of the imaging lens assembly.

13. A light blocking element, comprising:
a first surface;
a second surface corresponding to the first surface;
an inner annular surface connecting the first surface and the second surface, and forming an inner opening; and
an outer annular surface connecting an edge of the first surface and an edge of the second surface, and comprising:
three notches disposed on the outer annular surface; and
three arc surfaces located on the outer annular surface, wherein the three notches and the three arc surfaces are alternately arranged on the outer annular surface, and the three arc surfaces are coaxial and have different arc lengths;
wherein a maximal depth of each of the notches is d, and the following condition is satisfied:

0.03 mm<d≤0.15 mm;

wherein each of the at least three notches is singlet-symmetric and is formed into a single shape.

14. The light blocking element of claim 13, wherein contours of the three notches are the same.

15. The light blocking element of claim 13, wherein the three notches are straight cutting notches.

16. An imaging lens assembly, comprising:
the light blocking element of claim 13.

17. An optical element, comprising:
a first surface;
a second surface corresponding to the first surface;
an outer annular surface connecting an edge of the first surface and an edge of the second surface, and comprising:
three notches disposed on the outer annular surface, wherein a virtual outer circular arc line is formed between two ends of each of the notches, the virtual outer circular arc lines are coaxial, there is one connecting line which is formed between each middle point of any two virtual outer circular arc lines passing through a center of the optical element; and
three arc surfaces located on the outer annular surface, wherein the three notches and the three arc surfaces are alternately arranged on the outer annular surface, and the three arc surfaces are coaxial and have different arc lengths;
wherein a maximal depth of each of the notches is d, and the following condition is satisfied:

0.03 mm<d≤0.15 mm;

wherein each of the at least three notches is singlet-symmetric and is formed into a single shape.

18. The optical element of claim 17, wherein the optical element is an imaging lens element.

19. The optical element of claim 17, wherein the optical element is a spacer.

20. The optical element of claim 19, further comprising:
a gate end located on one of the two notches which have the connecting line formed between each middle point of two virtual outer circular arc lines thereof passing through the center of the optical element.

21. The optical element of claim 20, wherein the optical element comprises two gate ends located on each of the two notches, respectively.

22. An imaging lens assembly, comprising:
the optical element of claim 17.

23. A lens module, comprising:
the imaging lens assembly of claim 22; and
an image sensor, wherein the image sensor is disposed on an image surface of the imaging lens assembly.

* * * * *